(12) United States Patent
Wu et al.

(10) Patent No.: US 10,866,302 B2
(45) Date of Patent: Dec. 15, 2020

(54) METHOD, APPARATUS, AND SYSTEM FOR WIRELESS INERTIAL MEASUREMENT

(71) Applicant: ORIGIN WIRELESS, INC., Greenbelt, MD (US)

(72) Inventors: Chenshu Wu, Greenbelt, MD (US); Feng Zhang, Greenbelt, MD (US); Yusen Fan, Greenbelt, MD (US); Beibei Wang, Clarksville, MD (US); K. J. Ray Liu, Potomac, MD (US); Oscar Chi-Lim Au, San Jose, CA (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/870,996

(22) Filed: May 10, 2020

(65) Prior Publication Data

US 2020/0271747 A1    Aug. 27, 2020

Related U.S. Application Data

(63) Continuation-in-part of application No. 15/326,112, filed as application No. PCT/US2015/041037 on Jul.
(Continued)

(51) Int. Cl.
*G01S 5/02* (2010.01)
*H04W 4/029* (2018.01)
*G01P 15/18* (2013.01)

(52) U.S. Cl.
CPC ............ *G01S 5/0289* (2013.01); *G01P 15/18* (2013.01); *G01S 5/0264* (2020.05); *H04W 4/029* (2018.02)

(58) Field of Classification Search
CPC ...... G01S 13/726; G01S 13/003; G01S 13/72; G01S 13/723; G01S 7/415; G01S 7/41; G01S 7/411; G01S 7/006; G01S 7/00
See application file for complete search history.

(56) References Cited

U.S. PATENT DOCUMENTS 10,217,346 B1 *   2/2019   Zhang ................... G06N 3/088
10,551,479 B1 *   2/2020   Ylamurto ............. G01S 5/0284
(Continued)

*Primary Examiner* — Siu M Lee

(57) ABSTRACT

Methods, apparatus and systems for wireless inertial measurement are described. In one embodiment, a described system comprises a transmitter transmitting a wireless signal, a receiver, and a processor. The receiver is configured for: receiving the wireless signal through a wireless multipath channel, and extracting a plurality of time series of channel information (TSCI) of the wireless multipath channel from the wireless signal. One of the transmitter and the receiver is a stationary device, and the other one is a moving device moving with an object. The processor is configured for: determining that a first channel information (CI) at a first time of a first TSCI associated with a first antenna of the moving device matches a second CI at a second time of a second TSCI associated with a second antenna of the moving device, wherein both the first TSCI and the second TSCI are associated with a same antenna of the stationary device; computing at least one movement parameter and a spatial-temporal information (STI) of the moving device; and tracking at least one of the object and the moving device based on the STI.

29 Claims, 28 Drawing Sheets

Related U.S. Application Data 17, 2015, application No. 16/870,996, which is a continuation-in-part of application No. 16/127,151, filed on Sep. 10, 2018, which is a continuation-in-part of application No. PCT/US2017/021963, filed on Mar. 10, 2017, application No. 16/870,996, which is a continuation-in-part of application No. 16/125,748, filed on Sep. 9, 2018, which is a continuation-in-part of application No. PCT/US2017/015909, filed on Jan. 31, 2017, application No. 16/870,996, which is a continuation-in-part of application No. 15/861,422, filed on Jan. 3, 2018, and a continuation-in-part of application No. 16/200,608, filed on Nov. 26, 2018, now Pat. No. 10,735,298, and a continuation-in-part of application No. 16/446,589, filed on Jun. 19, 2019, now Pat. No. 10,742,475, and a continuation-in-part of application No. 16/667,648, filed on Oct. 29, 2019, and a continuation-in-part of application No. 16/667,757, filed on Oct. 29, 2019, and a continuation-in-part of application No. 16/790,610, filed on Feb. 13, 2020, and a continuation-in-part of application No. 16/790,627, filed on Feb. 13, 2020, and a continuation-in-part of application No. 16/798,337, filed on Feb. 22, 2020, and a continuation-in-part of application No. 16/798,343, filed on Feb. 22, 2020.

(60) Provisional application No. 62/846,686, filed on May 12, 2019, provisional application No. 62/846,688, filed on May 12, 2019, provisional application No. 62/849,853, filed on May 18, 2019, provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019, provisional application No. 62/950,093, filed on Dec. 18, 2019, provisional application No. 62/977,326, filed on Feb. 16, 2020, provisional application No. 62/980,206, filed on Feb. 22, 2020, provisional application No. 62/981,387, filed on Feb. 25, 2020, provisional application No. 62/984,737, filed on Mar. 3, 2020, provisional application No. 63/001,226, filed on Mar. 27, 2020.

(56) References Cited

U.S. PATENT DOCUMENTS

| | | | |
|---|---|---|---|
| 10,645,536 B1 * | 5/2020 | Barnes | H04W 4/021 |
| 2018/0183650 A1 * | 6/2018 | Zhang | G01S 13/003 |

* cited by examiner

METHOD, APPARATUS, AND SYSTEM FOR WIRELESS INERTIAL MEASUREMENT

CROSS-REFERENCE TO RELATED APPLICATIONS

The present application is related to U.S. patent application Ser. No. 16/871,000, entitled "METHOD, APPARATUS, AND SYSTEM FOR WIRELESS TRACKING WITH GRAPH-BASED PARTICLE FILTERING," filed on May 10, 2020, which is expressly incorporated by reference herein in its entirety.

The present application hereby incorporates by reference the entirety of the disclosures of, and claims priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(d) U.S. patent application Ser. No. 15/861,422, entitled "METHOD, APPARATUS, SERVER, AND SYSTEMS OF TIME-REVERSAL TECHNOLOGY", filed on Jan. 3, 2018,
(e) U.S. patent application Ser. No. 16/200,608, entitled "METHOD, APPARATUS, SERVER AND SYSTEM FOR VITAL SIGN DETECTION AND MONITORING", filed on Nov. 26, 2018,
(f) U.S. Provisional Patent application 62/846,686, entitled "METHOD, APPARATUS, AND SYSTEM FOR WIRELESS INERTIAL MEASUREMENT", filed on May 12, 2019,
(g) U.S. Provisional Patent application 62/846,688, entitled "Method, Apparatus, and System for Processing and Presenting Life Log based on a Wireless Signal", filed on May 12, 2019,
(h) U.S. Provisional Patent application 62/849,853, entitled "Method, Apparatus, and System for Wireless Artificial Intelligent in Smart Car", filed on May 18, 2019,
(i) U.S. patent application Ser. No. 16/446,589, entitled "METHOD, APPARATUS, AND SYSTEM FOR OBJECT TRACKING AND SENSING USING BROADCASTING", filed on Jun. 19, 2019,
(j) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
(k) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
(l) U.S. Provisional Patent application 62/900,565, entitled "QUALIFIED WIRELESS SENSING SYSTEM", filed on Sep. 15, 2019,
(m) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019,
(n) U.S. patent application Ser. No. 16/667,648, entitled "METHOD, APPARATUS, AND SYSTEM FOR WIRELESS PROXIMITY AND PRESENCE MONITORING", filed on Oct. 29, 2019,
(o) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
(p) U.S. Provisional Patent application 62/950,093, entitled "METHOD, APPARATUS, AND SYSTEM FOR TARGET POSITIONING", filed on Dec. 18, 2019,
(q) U.S. patent application Ser. No. 16/790,610, entitled "METHOD, APPARATUS, AND SYSTEM FOR WIRELESS GAIT RECOGNITION", filed Feb. 13, 2020,
(r) U.S. patent application Ser. No. 16/790,627, entitled "METHOD, APPARATUS, AND SYSTEM FOR OUTDOOR TARGET TRACKING", filed Feb. 13, 2020.
(s) U.S. Provisional Patent application 62/977,326, entitled "METHOD, APPARATUS, AND SYSTEM FOR AUTOMATIC AND ADAPTIVE WIRELESS MONITORING AND TRACKING", filed on Feb. 16, 2020,
(t) U.S. patent application Ser. No. 16/798,337, entitled "METHOD, APPARATUS, AND SYSTEM FOR WIRELESS OBJECT SCANNING", filed Feb. 22, 2020,
(u) U.S. patent application Ser. No. 16/798,343, entitled "METHOD, APPARATUS, AND SYSTEM FOR WIRELESS OBJECT TRACKING", filed Feb. 22, 2020,
(v) U.S. Provisional Patent application 62/980,206, entitled "METHOD, APPARATUS, AND SYSTEM FOR WIRELESS SENSING", filed on Feb. 22, 2020,
(w) U.S. Provisional Patent application 62/981,387, entitled "METHOD, APPARATUS, AND SYSTEM FOR VEHICLE WIRELESS MONITORING", filed on Feb. 25, 2020,
(x) U.S. Provisional Patent application 62/984,737, entitled "METHOD, APPARATUS, AND SYSTEM FOR IMPROVED WIRELESS MONITORING", filed on Mar. 3, 2020,
(y) U.S. Provisional Patent application 63/001,226, entitled "METHOD, APPARATUS, AND SYSTEM FOR IMPROVED WIRELESS MONITORING AND USER INTERFACE", filed on Mar. 27, 2020.

TECHNICAL FIELD

The present teaching generally relates to wireless inertial measurement system. More specifically, the present teaching relates to accurately tracking moving distance, heading direction, and rotating angle based on wireless channel information in a rich-scattering environment.

BACKGROUND

Motion measurements are essential inputs for a range of applications such as robot navigation, indoor tracking, and mobile gaming, etc., and have been widely used in robots, drones, automotive, unmanned vehicles, various consumer electronics, and pretty much anything that moves. The mainstream technology has been using Inertial Measurement Units (IMUs) for motion tracking. The rise in demand of accurate and robust motion tracking, coupled with an increase in smart device production, has been driving the IMU market, which is projected to grow from $15.71 billion in 2016 to $21.74 billion by 2022. An improvement to motion measurements will profoundly impact a number of systems and applications.

Precise and robust motion measurement is non-trivial. The prevalent IMUs realized by sensors, e.g. accelerometers that measure linear acceleration, gyroscopes that calculate angular velocity, and magnetometers that report orientation, are well known to suffer from significant errors and drifts. For example, an accelerometer is hardly capable of measuring moving distance due to the noisy readings; a magnetometer does not report heading direction and is easily distorted by surrounding environments; while a gyroscope experiences considerable drifts introduced by integration especially in a long run. These limitations prevent many applications that require accurate motion processing, such as indoor tracking, virtual reality, and motion sensing games.

In recent years, radio signals are used to localize and track targets. But these systems can only track locations while suffering from significant common limitations that prohibit ubiquitous accurate inertial measurements. First, these systems all require one or more precisely installed APs (Access Points), as well as accurate information about their locations and/or orientations. A small error in the APs' geometry information will lead to large location errors. Second, these systems can only determine one or two of multiple motion parameters from successive location estimates. They do not directly measure multiple motion parameters, and cannot track in-place angular motion. Third, these systems face accuracy limitations dictated by frequency bandwidth, antenna amount, and synchronization errors on commercial off-the-shelf (COTS) WiFi, and degenerate or even fail in complex Non-Line-Of-Sight (NLOS) scenarios.

SUMMARY

The present teaching generally relates wireless inertial measuring. More specifically, the present teaching relates to measuring multiple parameters of object motions, namely moving distance, heading direction, and rotating angle in a rich-scattering environment, e.g. an indoor environment or urban metropolitan area, enclosed environment, underground environment, etc.

In one embodiment, an object tracking system is described. The object tracking system comprises: a transmitter, a receiver, and a processor. The transmitter is configured for transmitting a wireless signal through a wireless multipath channel. The receiver is configured for: receiving the wireless signal through the wireless multipath channel, and extracting a plurality of time series of channel information (TSCI) of the wireless multipath channel from the wireless signal. Each of the plurality of TSCI is associated with an antenna of the transmitter and an antenna of the receiver. One of the transmitter and the receiver is a stationary device. The other one of the transmitter and the receiver is a moving device moving with an object. The processor is configured for: determining that a first channel information (CI) at a first time of a first TSCI associated with a first antenna of the moving device matches a second CI at a second time of a second TSCI associated with a second antenna of the moving device, wherein both the first TSCI and the second TSCI are associated with a particular antenna of the stationary device; computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna; computing a spatial-temporal information (STI) of the moving device based on at least one of: the at least one movement parameter, the first time, the second time, the configuration of antennas of the moving device, the configuration of at least one antenna of the stationary device, a past STI, and a past movement parameter, wherein at least one of the movement parameter and the STI is related to a current movement of the moving device; and tracking the object and the moving device based on the STI.

In another embodiment, a method, implemented by a processor, a memory communicatively coupled with the processor, and a set of instructions stored in the memory to be executed by the processor, is described. The method comprises: obtaining a plurality of time series of channel information (TSCI) of a wireless multipath channel, wherein: the plurality of TSCI are extracted from a wireless signal transmitted from a first wireless device to a second wireless device through the wireless multipath channel, each of the plurality of TSCI is associated with an antenna of the first wireless device and an antenna of the second wireless device, one of the first wireless device and the second wireless device is a stationary device, the other one of the first wireless device and the second wireless device is a moving device moving with an object; determining that a first channel information (CI) at a first time of a first TSCI associated with a first antenna of the moving device matches a second CI at a second time of a second TSCI associated with a second antenna of the moving device, wherein both the first TSCI and the second TSCI are associated with a same antenna of the stationary device; computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna; computing a spatial-temporal information (STI) of the moving device based on at least one of: the at least one movement parameter, the first time, the second time, the configuration of antennas of the moving device, the configuration of at least one antenna of the stationary device, a past STI, and a past movement parameter, wherein at least one of the movement parameter and the STI is related to a current movement of the moving device; and tracking at least one of the object and the moving device based on the STI.

In a different embodiment, an object tracking system is described. The object tracking system comprises: a transmitter, and a receiver that comprises a processor, a memory communicatively coupled with the processor, and a set of instructions stored in the memory to be executed by the processor. The transmitter is configured for transmitting a wireless signal through a wireless multipath channel. The receiver is configured for: receiving the wireless signal through the wireless multipath channel, extracting a plurality of time series of channel information (TSCI) of the wireless multipath channel from the wireless signal; wherein: each of the plurality of TSCI is associated with an antenna of the transmitter and an antenna of the receiver, one of the transmitter and the receiver is stationary, the other one of the transmitter and the receiver is a moving device moving with an object; determining that a first channel information (CI) at a first time of a first TSCI associated with a first antenna of the moving device matches a second CI at a second time of a second TSCI associated with a second antenna of the moving device, wherein both the first TSCI and the second TSCI are associated with a particular antenna of the stationary device; computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna; computing a spatial-temporal information (STI) of the moving device based on at least one of: the at least one movement parameter, the first time, the second time, the configuration of antennas of the moving device, the configuration of at least one antenna of the stationary device, a past STI, and a past movement parameter, wherein at least one of the movement parameter and the STI is related to a current movement of the moving device; and tracking at least one of the object and the moving device based on the STI.

Other concepts relate to software for implementing the present teaching on wireless object tracking in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
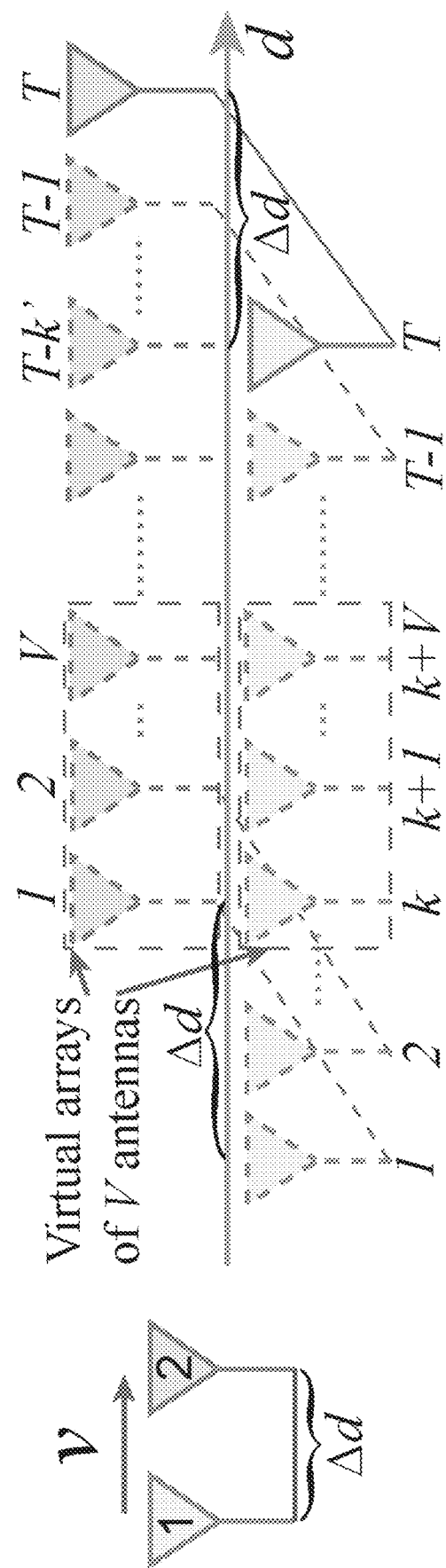
FIG. 1 illustrates virtual antenna alignment, according to some embodiments of the present disclosure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface. "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI. The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a retraining, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated. There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object. The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals. For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address. A location of a Type 2 device in the venue may be computed based on the particular MAC address, the series of probe signals, and/or the at least one TSCI obtained by the Type 2 device from the probe signals. The computing may be performed by the Type 2 device. The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel. The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different. The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same. The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time. The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device. Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device. The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver). Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source. If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration. The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually. The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc. The two channels may be associated with different kinds of wireless system (e.g.

two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE. The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "Star-Bud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.). For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period. At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event. At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device. A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna (s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting l/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^b$, $abs(X^a - Y^b)$, $(X-Y)^a$, (X/Y), (X+a)/(Y+b), $(X^a/Y^b)$, and $((X/Y)^a - b)$, wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X= $(x\_1, x\_2, \ldots, x\_n)$ and Y=$(y\_1, y\_2, \ldots, y\_n)$. The function may be a function of at least one of: $x\_i$, $y\_i$, $(x\_i - y\_i)$, $(y\_i - x\_i)$, $abs(x\_i - y\_i)$, $x\_i\ \hat{}\ a$, $y\_i\ \hat{}\ b$, $abs(x\_i\ \hat{}\ a - y\_i\ \hat{}\ b)$, $(x\_i - y\_i)\hat{}a$, $(x\_i/y\_i)$, $(x\_i + a)/(y\_i + b)$, $(x\_i\ \hat{}\ a/y\_i\ \hat{}\ b)$, and $((x\_i/y\_i)\hat{}a - b)$, wherein i is a component index of the n-tuple X and Y, and 1<=i<=n. E.g. component index of $x\_1$ is i=1, component index of $x\_2$ is i=2. The function may comprise a component-by-component summation of another function of at least one of the following: $x\_i$, $y\_i$, $(x\_i - y\_i)$, $(y\_i - x\_i)$, $abs(x\_i - y\_i)$, $x\_i\ \hat{}\ a$, $y\_i\ \hat{}\ b$, $abs(x\_i\ \hat{}\ a - y\_i\ \hat{}\ b)$, $(x\_i - y\_i)\hat{}a$, $(x\_i/y\_i)$, $(x\_i + a)/(y\_i + b)$, $(x\_i\ \hat{}\ a/y\_i\ \hat{}\ b)$, and $((x\_i/y\_i)\hat{}a - b)$, wherein i is the component index of the n-tuple X and Y. For example, the function may be in a form of $sum\_\{i=1\}\hat{}n\ (abs(x\_i/y\_i)-1)/n$, or $sum\_\{i=1\}\hat{}n\ w\_i * (abs(x\_i/y\_i)-1)$, where $w\_i$ is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i\hat{}\{th\}$ domain item is mapped to the $j\hat{}\{th\}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated. The first section of the first time duration of the first TSCI may be a sliding section of the first TSCI. The second section of the second time duration of the second TSCI may be a sliding section of the second TSCI. A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%). In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier. The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information, transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, L_1 norm, L_2 norm, L_k norm for k>2, statistical distance, correlation, correlation indicator, auto-correlation, covariance, auto-co-variance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object. The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, rooftop, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/ tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/ audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/ bucket/container, smart plate/cup/bowl/pot/mat/utensils/ kitchen tools/kitchen devices/kitchen accessories/cabinets/ tables/chairs/tiles/lights/water pipes/taps/gas range/oven/ dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car). The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/ correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/ heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, subsurface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc. Machine learning, training, discriminative training, deep learning, neural network, continuous time processing, distributed computing, distributed storage, acceleration using GPU/DSP/coprocessor/multicore/multi-processing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSD, map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects. The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time. For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function. The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost. The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.). The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc. The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.).

Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away. Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface(UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

The present teaching discloses an RF-based Inertial Measurement (RIM) system that measures multiple parameters of object motions, namely moving distance, heading direction, and rotating angle. In one embodiment, a RIM system, or RIM, can turn standard commercial off-the-shelf (COTS) WiFi radios into precise Inertial Measurement Units (IMUs), without support from additional infrastructure or external sensors. RIM does not require large bandwidth, many phased antennas, or multiple APs as reference anchors, nor does it need a priori calibration or fingerprinting of the environment. It has minimal requirements of mere antennas available on COTS WiFi receivers, in addition to a single arbitrarily placed AP as a transmitter, without knowing the AP's location or orientation. RIM measures the Channel State Information (CSI) of packets transmitted by the AP, without any other support from it. In contrast to many prior indoor tracking proposals that are flawed in Non-Line-Of-Sight (NLOS), RIM works anywhere the AP signal reaches, through Line-Of-Sight (LOS) or through multiple walls.

In one embodiment, RIM enables inertial measurement purely based on RF signals, turning COTS WiFi radios into accurate IMUs. Specifically, it aims at measuring three dimensions of motion parameters as traditional IMUs do, yet at a much finer precision: A) Moving distance: the translation distance the target has moved, which is usually coarsely sensed by accelerometer by step counting; B) Heading direction: the moving direction, which is very difficult for conventional sensors to measure and thus usually assumed as the device orientation reported by magnetometer; and C) Rotating angle: the angle of angular rotation, typically measured by gyroscope.

RIM estimates all these parameters for 2D motions in a universal scheme termed as virtual antenna retracing and boosts the precision by a novel approach for super-resolution virtual antenna alignment. Then one can strive to enable RIM COTS WiFi, delivering a comprehensive system for accurate and robust inertial measurement.

RIM leverages an unseen opportunity with MIMO WiFi radios present in most smart hardware. As shown in FIG. 1, when the antenna array moves, Antenna #1 will retrace the locations where Antenna #2 has traveled and will be spatially aligned with a virtual antenna when and only when it arrives at the particular location where Antenna #2 generated that virtual antenna $\Delta t$ time ago. The moving speed can thus be estimated as $v=\Delta d/\Delta t$, according to some embodiments of the present disclosure.

In general, when an antenna array moves, one antenna may retrace the trajectory of another and observe the same channel when and only when it arrives at a location traveled by the preceding antenna, allowing for a possibility of "self-tracing" of the array at micro and transient scale. This observation leads to the design of RIM, structured around three components, which thwarts the conventional burdensome "outside-in" tracking solutions and enables precise motion measurement in a ubiquitous "inside-out" system.

As a first component, spatial-temporal virtual antenna retracing may be performed. Take the two-antenna array as shown in FIG. 1 as an intuitive example. When the array moves, each antenna captures a channel snapshot at every point along its trajectory as if it sets up a virtual antenna there. The antenna travels later (i.e., the following antenna, Antenna #1 in this example) will retrace every location the preceding antenna (Antenna #2) has traveled. From the time offset the following antenna takes to be spatially aligned with (i.e., arrive at the location of) a virtual antenna that the preceding antenna emulated, one can estimate the moving speed by dividing the travel distance by the time offset. Here the travel distance is identical to the antenna separation, which is known and fixed independent of how they move. Extending to 2-dimentional (2D) antenna arrays (e.g., a circular array as in FIG. 2, one can track the speed along multiple directions designated by different pairs of antennas. That is, one can measure the moving distance and heading direction using a 2D array. The main challenge, however, is to detect the spatial alignment of two virtual antennas with high precision.

As a second component, a super-resolution virtual antenna alignment may be performed. The key insight behind highly accurate antenna alignment is that signals received at different locations undergo diverse reflecting paths and delays, resulting in a unique multipath profile for each location (virtual antenna). Achieving super-resolution alignment is non-trivial because: 1) channel measurements on COTS WiFi are considerably noisy, 2) there is only one single measurement associated with one virtual antenna, and 3) it is performed upon measurements from different antennas with hardware heterogeneity. In RIM, one can achieve sub-centimeter resolution virtual antenna alignment by three folds. First, one can leverage the physics of time-reversal focusing effects in electromagnetic waves and employ an effective metric to distinguish two channel snapshots, which significantly improve location distinction. Second, although a single measurement may not be robustly distinctive, the alignment can be boosted by leveraging a number of virtual antennas, forming a virtual massive array. Yet different from some previous works using virtual arrays for Synthetic Aperture Radar, there is no need for any information on how the virtual antennas are located in space. Third, one can just focus on potential alignment within a short period (e.g., 0.5 seconds) over a small space (e.g., centimeters), for which the channel is unlikely to be changed.

As a third component, a precise motion reckoning may be performed. Built upon virtual antenna retracing and alignment, one can devise a novel algorithm to: 1) accurately and robustly pinpoint the temporal delays when two antennas are spatially aligned, 2) reliably determine which pair of antennas, among others, are aligned at a specific time, and 3) systematically integrate all information together to output moving distance, heading direction, and rotating angle if there is any.

A) Spatial-Temporal Virtual Antenna Alignment—Virtual Antenna Retracing. The key idea to turn a WiFi radio into an IMU lies in a novel scheme for local motion tracking, named spatial-temporal virtual antenna retracing (STAR). It will be illustrated that how STAR enables measuring linear and angular motion, first in 1-dimentional (ID) and then 2-dimentional (2D) cases.

A.1) 1D case: Recall the simplest scenario of a two-antenna array in ID case, as shown in FIG. 1. When two antennas are moving along the line formed by themselves, one antenna will lead the trajectory while another immediately follows its "footprints". Whichever antenna will take a snapshot of a location it passed through by recording the CSI observations, as if it sets up a virtual antenna there. Since the two antennas are moving along the same trace, one after another, the following antenna will continuously encounter the virtual phantoms of the leading one. Considering time $t_k$ in FIG. 1, the blue following antenna arrives at the location where the green leading antenna traveled through at time $t_1$. By examining the arriving time difference $\Delta t = t_k - t_1$, one can derive the antenna array's traveling speed $v = \Delta d / \Delta t$, where the traveling distance during this time offset is known a priori as the separation distance $\Delta d$ between the two antennas. Then by continuously aligning the following antenna with the leading antenna's "footprints", one can obtain the real-time speeds along the whole trajectory. The moving direction is the orientation of the ray formed by the two aligned antennas. In one word, the key to estimate motion distance and orientation is to determine: (1) whether or not two antennas are aligned, and (2) if yes, what the time delay $\Delta t$ is.

Figure 3A:
FIGS. 3A-3C illustrate an example of antenna arrays, where a linear, triangular, and quadrangular array produces at most 2, 6, and 12 tractable directions, respectively, according to some embodiments of the present disclosure.
Figure 3B:
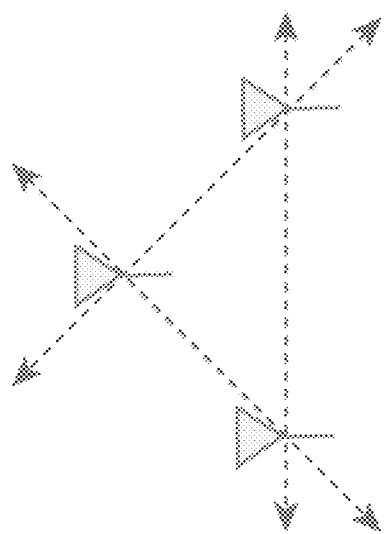
Figure 3C:
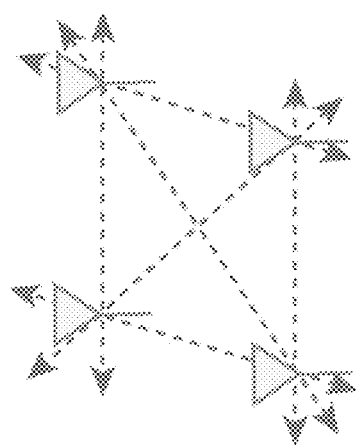

A.2) 2D case: To measure distance and orientation in 2D space, one can resort to 2D arrays of antennas. Similar to the 1D case, each pair of antennas enables distance measurement for the two directions of the line formed by them. Therefore, multiple pairs offer multiple directions in which one can measure moving distances. FIG. 3A to FIG. 3C illustrate several examples of antenna arrays. As shown in FIG. 3A, a two-element array (or any linear array) only supports two directions in a line. With three antennas arranged in a triangle shown in FIG. 3B, one can track motion along three lines, each with two moving directions. By adding one more antenna to form a quadrangle shown in FIG. 3C, one can obtain 6 antenna pairs, providing at most 12 directions.

Ideally, m antennas will form $m \times (m-1)/2$ lines in 2D space, each corresponding to a pair of antennas, yielding $m \times (m-1)$ supported directions that lead to an orientation resolution of $2\pi/(m \times (m-1))$. Practically, the resolution will be lower since some pairs may be parallel with each other and the corresponding directions become the same. For example, a square array of 4 antennas only has 8 directions, while ideally a quadrangular array supports 12 directions (FIG. 3C). Fortunately, those parallel antenna pairs can be leveraged for augmented alignment to facilitate distance and angle measurement.

The angle of rotation for angular motion is derived in a different way from the heading direction. For linear motion in a specific direction, only several pairs (at most 3 in the hexagonal case) of antennas would be aligned. Differently, in presence of rotation, every adjacent pair will be aligned at the same time since all of them move along the same circle. As a consequence, one can sense rotation by detecting concurrent alignment between all adjacent antennas, and further calculate the rotating angle.

Figure 2:
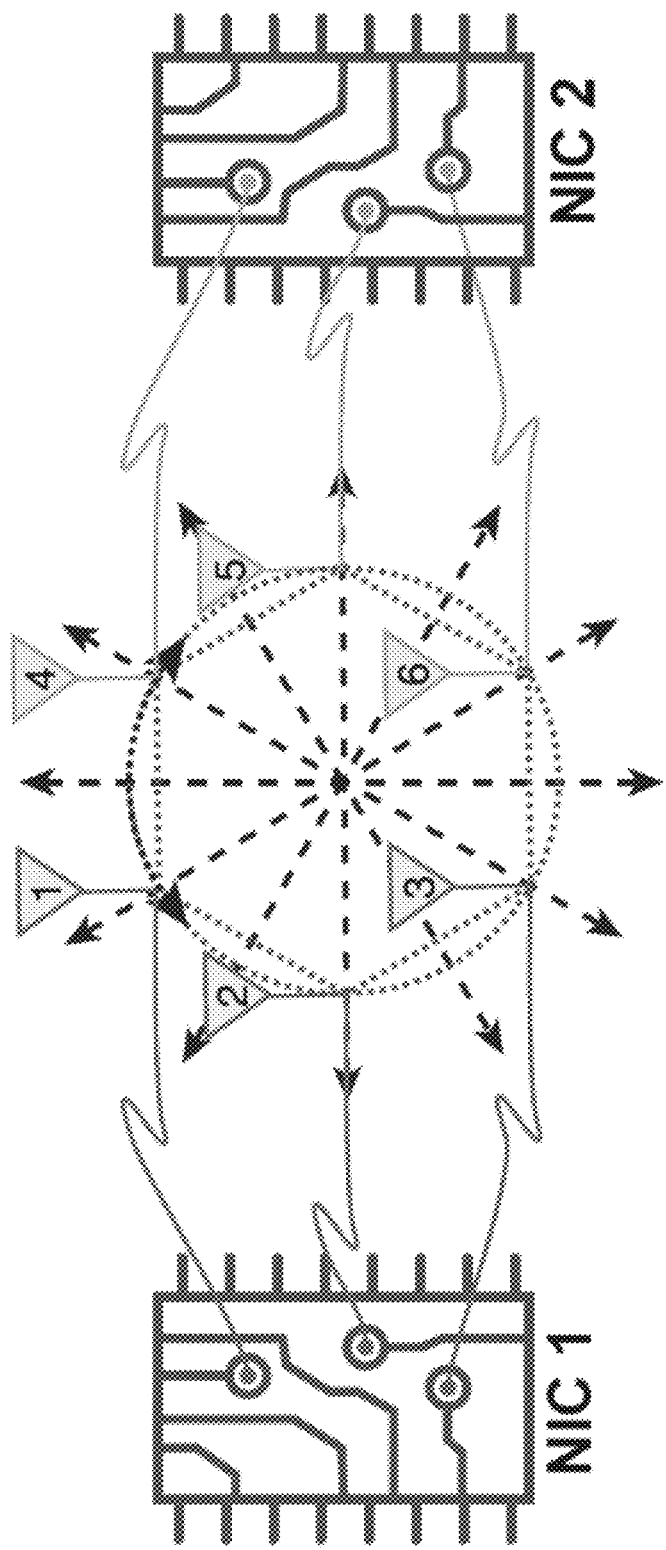
FIG. 2 illustrates an exemplary setting of 6-element circular array, which can be built by placing together the antennas of two commodity WiFi radios, for 2-dimentional measurement, according to some embodiments of the present disclosure.

A.3) Hexagonal array: In principle, the more antennas are available, the finer distance and orientation resolution one can have. Considering that most COTS WiFi radios are equipped with 3 antennas, one can prototype RIM with a hexagonal array built from two COTS WiFi cards, as shown in FIG. 2. Such an array provides 12 different directions in total and thus an orientation resolution of 30°. For each possible direction, there will be at least two pairs of antennas being aligned, making the measurements more robust.

The hexagonal design does not require cumbersome phase synchronization across multiple antennas or between the two WiFi NICs (Network Interface Cards). RIM applies to different antenna arrays, especially the upcoming WiFi chipsets with more antennas and shorter wavelengths, which will immediately offer a better resolution in both distance and orientation.

B) Spatial-Temporal Virtual Antenna Alignment—Super-resolution Virtual Antenna Alignment: To put the idea of STAR into practice is a highly challenging task that requires accurately pinpointing a space-time point that two virtual antennas are aligned with each other, at sub-centimeter precision. This task significantly differs from traditional fingerprint matching. In particular, previous fingerprinting: (1) needs a priori calibration, (2) requires CSI to be unique over the whole space and stable over a long time, and (3) usually accumulates a number of training samples. In contrast, RIM requires no calibration and consumes only channel measurements in a narrow space (e.g., a few centimeters) and in a transient period (e.g., within 0.5 second). In addition, RIM needs to align two individual antennas, each with only one single channel measurement and expects the largest similarity in their measurements (meaning that the two antennas are best aligned) to be only observed by the measurements recorded by the two antennas at the same space location, with a millimeter-level resolution.

In RIM, one can introduce two techniques to achieve sub-centimeter resolution: (1) a similarity measure, i.e., Time-Reversal Resonating Strength (TRRS), for channel samples inspired by the time-reversal focusing effects; and (2) an approach to exploit a large number of virtual antennas as a virtual massive array for alignment. In the following, a primer is presented on time-reversal focusing effect, followed by the definition of TRRS and then the enhancement by virtual massive antennas.

B. 1) Time-reversal focusing effects: Time reversal is a physical phenomenon that the energy of the transmitted signal will be focused in both space and time domains when combined with its time-reversed and conjugated counterpart. It has been applied to and experimentally verified in the fields of ultrasonic, acoustics, light, and electromagnetism. Time reversal relies on two basic assumptions of channel reciprocity and stationarity, which both hold in the scenarios here since only typical indoor channel measurements are considered within an instantaneous time window (e.g., 0.5 seconds). To put it in the context of WiFi channel, the received CSI, when combined with its time-reversed and conjugated counterpart, will add coherently at the intended location but incoherently at any unintended location, creating a spatial focusing effect as has been analyzed in. This explains, fundamentally, why multipath profiles can underpin high-resolution location distinction. Inspired by it, the present teaching introduces TRRS, a metric that quantifies the time-reversal focusing effect, as the similarity measure for CSI as follows.

B.2) Time-reversal resonating strength: The TRRS between two Channel Impulse Responses (CIRs) h1 and h2 is defined as $$\kappa(h_1, h_2) = \frac{(\max_i |(h_1 * g_2)[i]|)^2}{\langle h_1, h_1 \rangle \langle g_2, g_2 \rangle} \quad (1)$$

where * denotes linear convolution, $\langle x,y \rangle$ is the inner product between vector x and y, and $g_2$ is the time-reversed and conjugated version of $h_2$, i.e., $g_2[k]=h_2[T-1-k]$, $k=0, \ldots, T-1$.

In practice, the frequency domain Channel Frequency Response (CFR) is more often used. Equivalently, the TRRS in Eqn. (1) can be expressed for two CFRs H1 and H2 as:

$$\kappa(H_1, H_2) = \frac{|H_1^H H_2|^2}{\langle H_1, H_1 \rangle \langle H_2, H_2 \rangle}, \quad (2)$$

If $H_1$ and $H_2$ are both normalized, then the TRRS becomes simply the square of their inner product, i.e., $\kappa(H_1, H_2)=|H_1^H H_2|^2$. Obviously, $\kappa(H_1, H_2) \in [0, 1]$, and $\kappa(H_1, H_2)=1$ if and only if $H_1=cH_2$ where $c \neq 0$, is any complex scaling factor. While previously many heuristic metrics were used to compare CSI, the TRRS exploits the physical time-reversal focusing effects in an uncomplicated form.

CSI measured on COTS WiFi contains phase offsets, including carrier frequency offset (CFO), sampling frequency offset (SFO), and symbol timing offset (STO) due to unsynchronized transmitters and receivers, in addition to initial phase offset caused by the phase locked loops. As can be seen from Eqn. (2), the impact of the annoying initial phase distortion, which could only be calibrated by manual calibration previously, is completely eliminated by taking the absolute value. One can calibrate the other linear offsets by using a sanitation approach.

Time-reversal focusing effects will be intensified with larger bandwidths. To facilitate the robustness and uniqueness of TRRS, one can exploit spatial diversity attributed by multiple transmit antennas to gain larger effective bandwidth. Specifically, suppose there are N antennas on the AP. The CSI measured on the i-th receive antenna at time t is $H_i(t)=\{H_{i,1}(t), H_{i,2}(t) \ldots, H_{i,N}(t)\}$ where $H_{j,k}(t)$ is the CSI between the i-th receive antenna and the kth transmit antenna. One can then take the average TRRS of the i-th and j-th receive antenna as:

$$\kappa(H_i(t_i), H_j(t_j)) = \frac{1}{N}\sum_{k=1}^{N} \kappa(H_{i,k}(t_i), H_{j,k}(t_j)) \quad (3)$$

By the above definition, one can avoid the need of synchronizing two antennas, but instead take the average of their individually calculated TRRS values.

B.3) Virtual massive antennas: Mainstream APs only have a few antennas, limiting the resolution and robustness of the average TRRS in Eqn. (3) to measurement noise. To boost super-resolution alignment, the present teaching discloses to leverage a number of virtual antennas emulated by the sequence of channel snapshots recorded by a moving antenna, forming a virtual massive antenna array whose size is the number of channel snapshots. As shown in FIG. 1, one can extend the multipath profile of an antenna i at time t from a single snapshot $H_i(t)$ to a sequence of samples $$P_i(t) = \left[H_i(t+k), k = -\frac{V}{2}, \ldots, \frac{V}{2}\right],$$

where $H_i(t+k)$, indicates the channel measurement emulating the virtual antenna set up by antenna i at time t+k, and V is the number of virtual antennas.

Figure 4A:
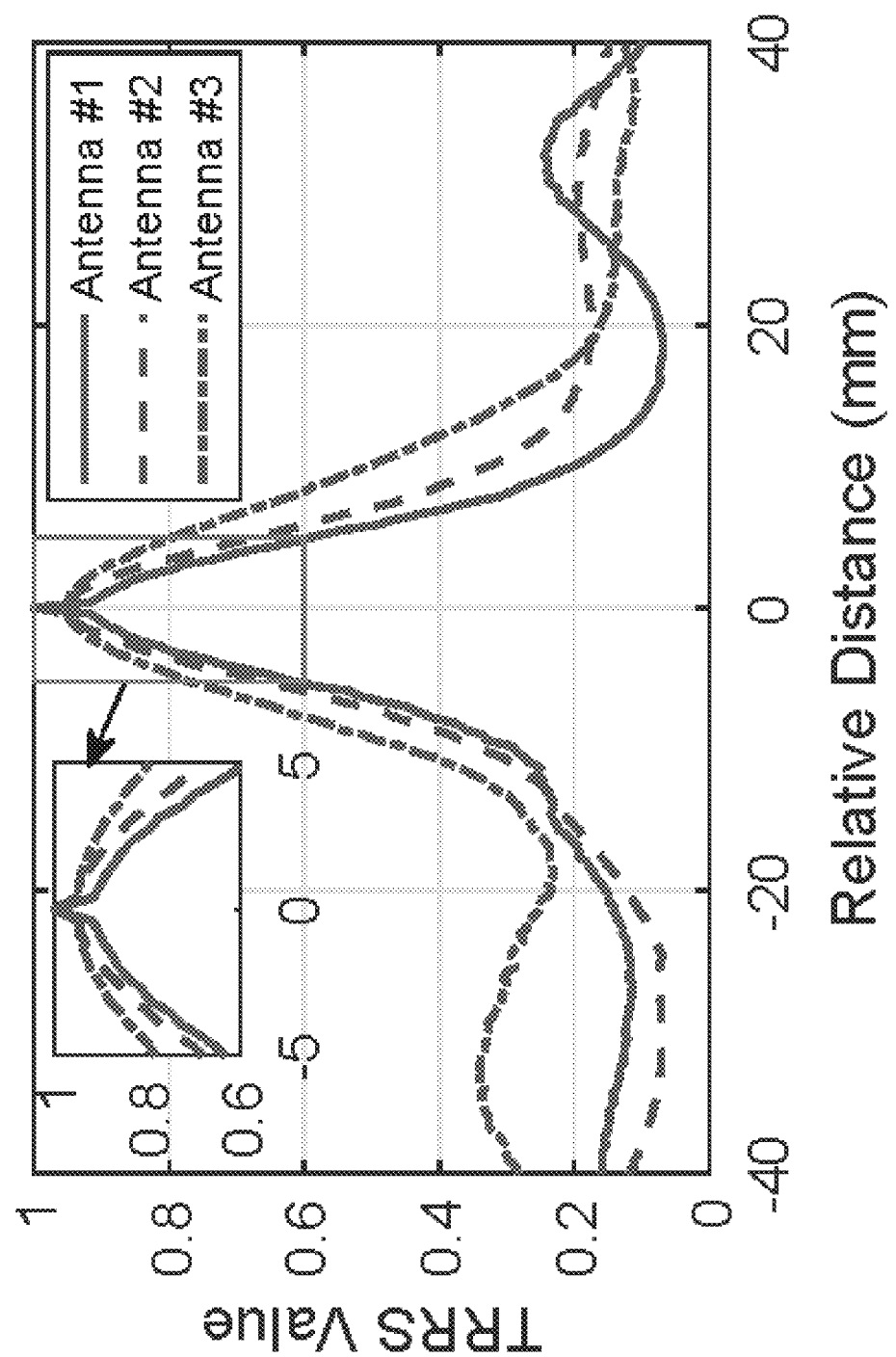
FIGS. 4A-4B illustrate the spatial resolution of time reversal resonating strength (TRRS), according to some embodiments of the present disclosure.
Figure 4B:
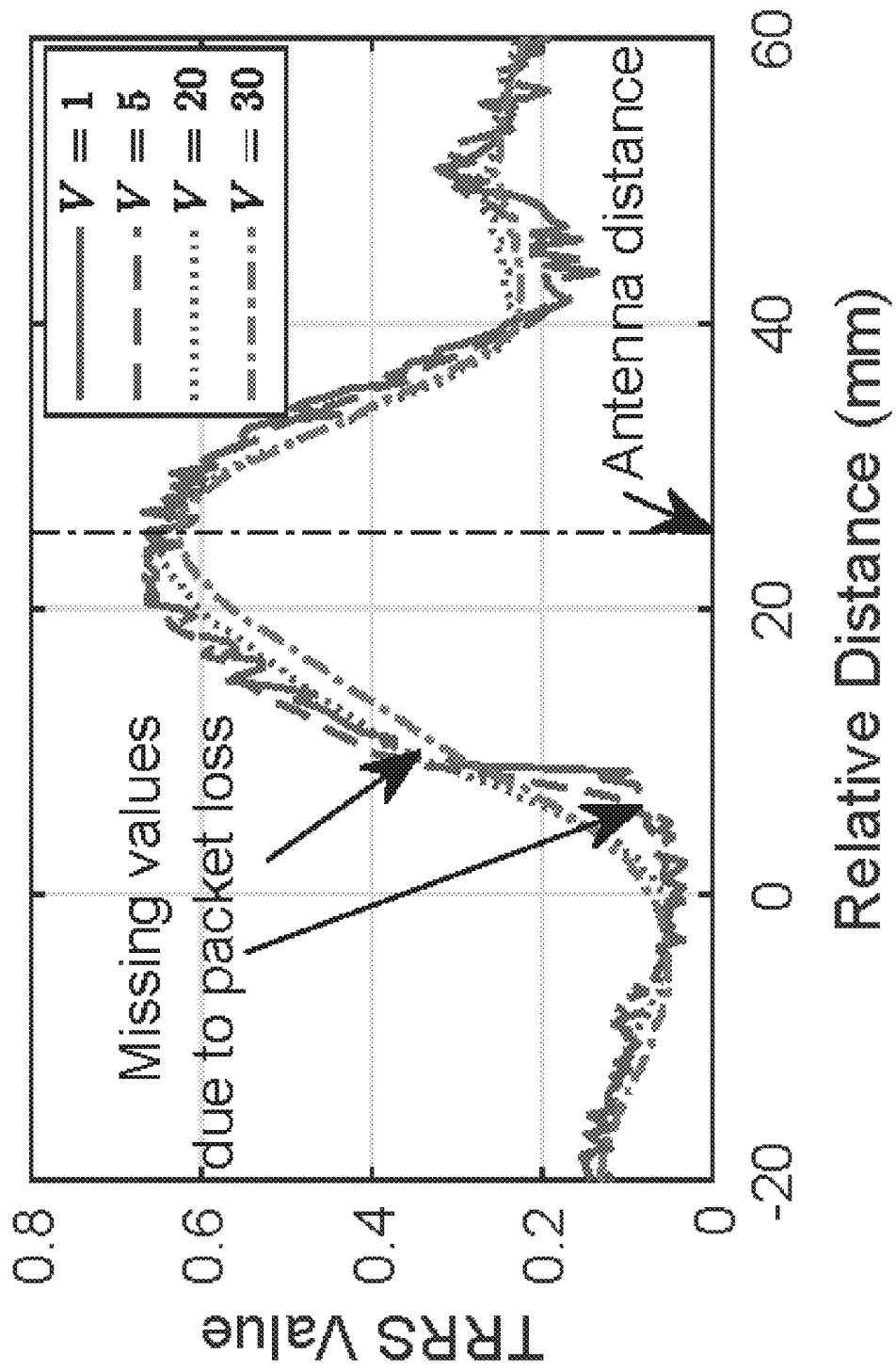

Accordingly, one can calculate the TRRS with V virtual massive antennas as $$\kappa(P_i(t_i), P_j(t_j)) = \frac{1}{V}\sum_{k=-\frac{V}{2}}^{\frac{V}{2}} \kappa(H_i(t_i + k), H_j(t_j + k)) \quad (4)$$

where $H_i(t_i-k)$ and $H_j(t_j-k)$ denote the respective virtual antenna placed at certain space location by the i-th and j-th antenna at time $t_i-k$ and $t_j-k$. By using the virtual massive antennas, one can largely boost the effective bandwidth of the multipath profile and thus enhance the time-reversal focusing effect, or equivalently, attain highly precise antenna alignment. As shown in FIG. 4A and FIG. 4B, the TRRS touches the maximum only when two antennas are closest with each other (precisely aligned) and drops even when they are separated by several millimeters. According to FIG. 4A, three antennas are moving at a constant speed and the TRRS for each antenna with respect to itself is calculated. As seen, the TRRS drops immediately (significantly by up to 0.3) when the antenna moves for a few millimeters, and monotonously decreases within a range of about 1 cm. According to FIG. 4B, the spatial decay holds for cross-antenna TRRS, especially with virtual massive antennas, although the absolute values decrease.

B.4) TRRS matrix: To pinpoint the precise temporal delay when two antennas i and j are spatially aligned, one can match the multipath profile of antenna i against those of antenna j throughout a sliding window. Consider a window of length 2 W, the TRRS vector is calculated as $G_{ij}(t) = [\kappa(P_i(t), P_j(t-l)), l=-W, \ldots, W]^T$ where l denotes the time lags. Thus if the antennas move for a period of T, one can obtain a TRRS matrix $$G_{ij} = [G_{ij}(t_1), G_{ij}(t_2), \ldots, G_{ij}(t_T)]. \quad (5)$$

Figure 5:
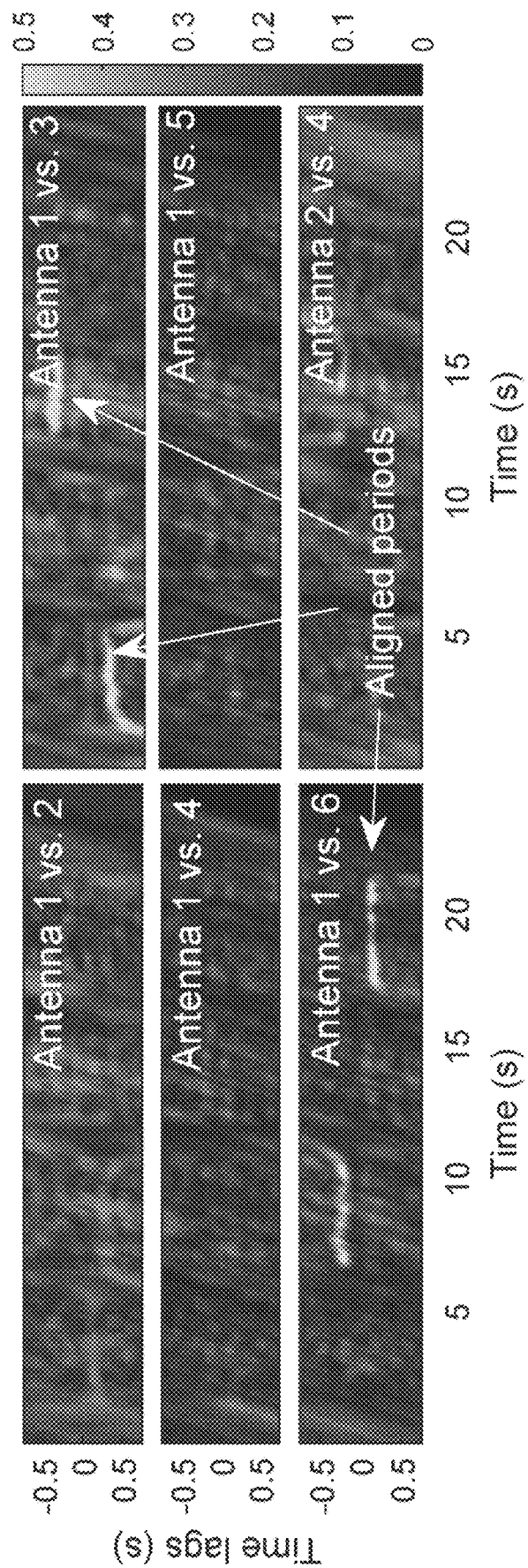
FIG. 5 illustrates exemplary experimental results of alignment matrices of a square-shape trajectory, according to some embodiments of the present disclosure.

In RIM, one can calculate such TRRS matrix for every pair of antennas as shown in FIG. 5. Then motion parameters are then estimated by identifying the aligned pairs from the TRRS matrices and continuously estimating the time delays, and accordingly the moving speed.

According to FIG. 5, the aligned pairs of the hexagonal array are 1 vs. 3 followed by 1 vs. 6, and then again 3 vs. 1, 6 vs. 1 in turn, according to some embodiments of the present disclosure. Other pairs in parallel with one of the above are not shown.

Figure 6A:
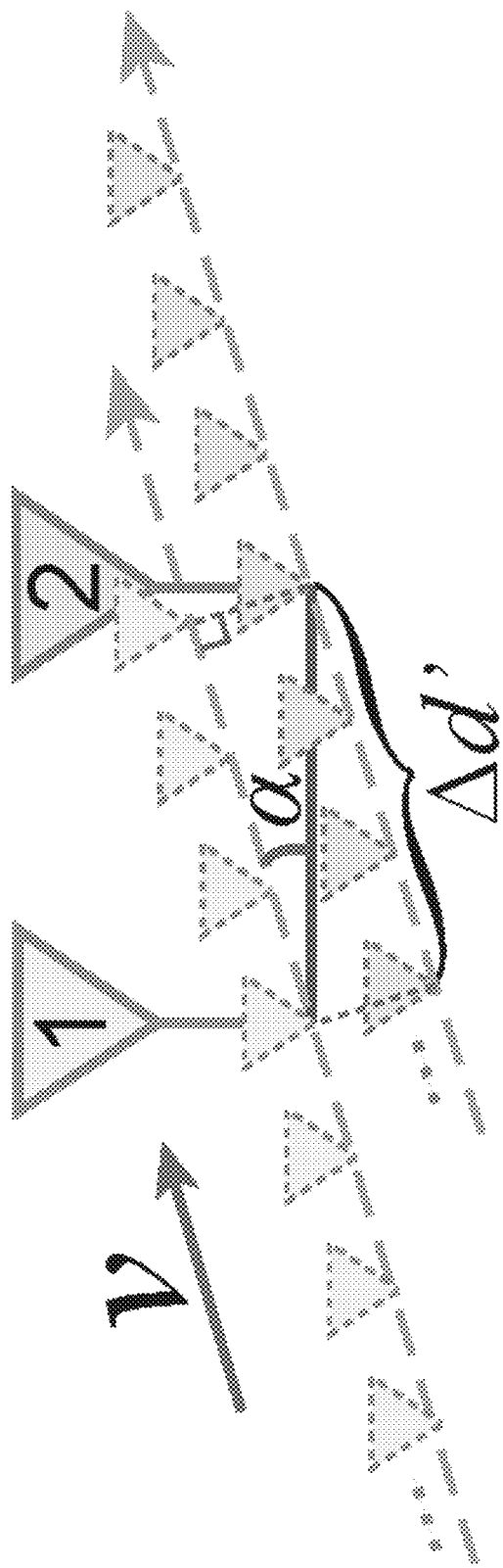
FIGS. 6A-6B illustrate exemplary antenna alignment in case of deviation retracing, according to some embodiments of the present disclosure.
Figure 6B:
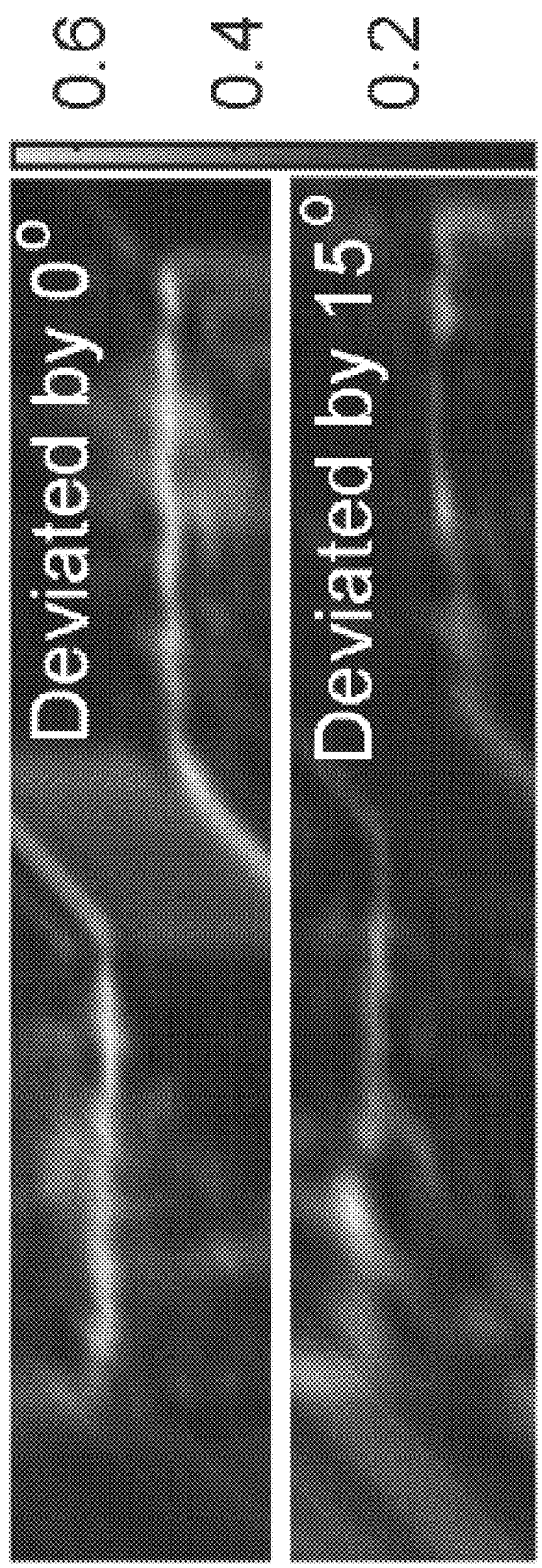

B.6) Deviated retracing: The above discussion assumed that the antenna array is moving along a certain direction in which at least two antennas will be perfectly aligned with each other. In practice, the device may be swinging in directions slightly deviated from the exact aligned line, as shown in FIG. 6A, where the array is moving along a direction that deviates an angle of α from their aligned direction, i.e., the horizontal line. But noticeable TRRS peak still exists, albeit weaker, for two antennas that are close enough yet not exactly aligned in case of deviation angles. Hence virtual antenna alignment is still feasible since one may only focus on the relative TRRS peaks within a window instead of the absolute values, circumventing the impacts of reduced TRRS values due to deviated retracing. In particular, as shown in FIG. 6B, RIM can tolerate up to 15° deviation, which suffices to cover the complete 2D plane with 6-element circular array.

As shown in FIG. 6A, in case of deviation, the "deviated" antenna separation becomes $\Delta d' = \Delta d \cos \alpha$. Since there is no knowledge about the deviation angle α in advance, one can directly let $\Delta d' \approx \Delta d$ in RIM, leading to an overestimated factor of $1/\cos \alpha$ in distance estimation. In terms of the 6-element circular array, the overestimated error will be 1.20% in average, assuming the moving directions are uniformly distributed in [00, 360°], and reaches the worst of 3.53% when the deviation angle α=15°, which is tolerable in practice. The deviation angle may be resolvable by quantitatively comparing the reduced TRRS to the expected value of perfect alignment.

Measuring Motion: The millimeter resolution antenna alignment underpins inertial estimation in centimeter accuracy in practice. To measure motions, one can first examine whether movement exists. If yes, one can then attempt to obtain the aligned trends of each antenna pair, and accordingly determine when and which pairs are well aligned. From the aligned antenna pairs, one can derive the distance, heading direction, and angle of rotation if there is any.

Figure 7:
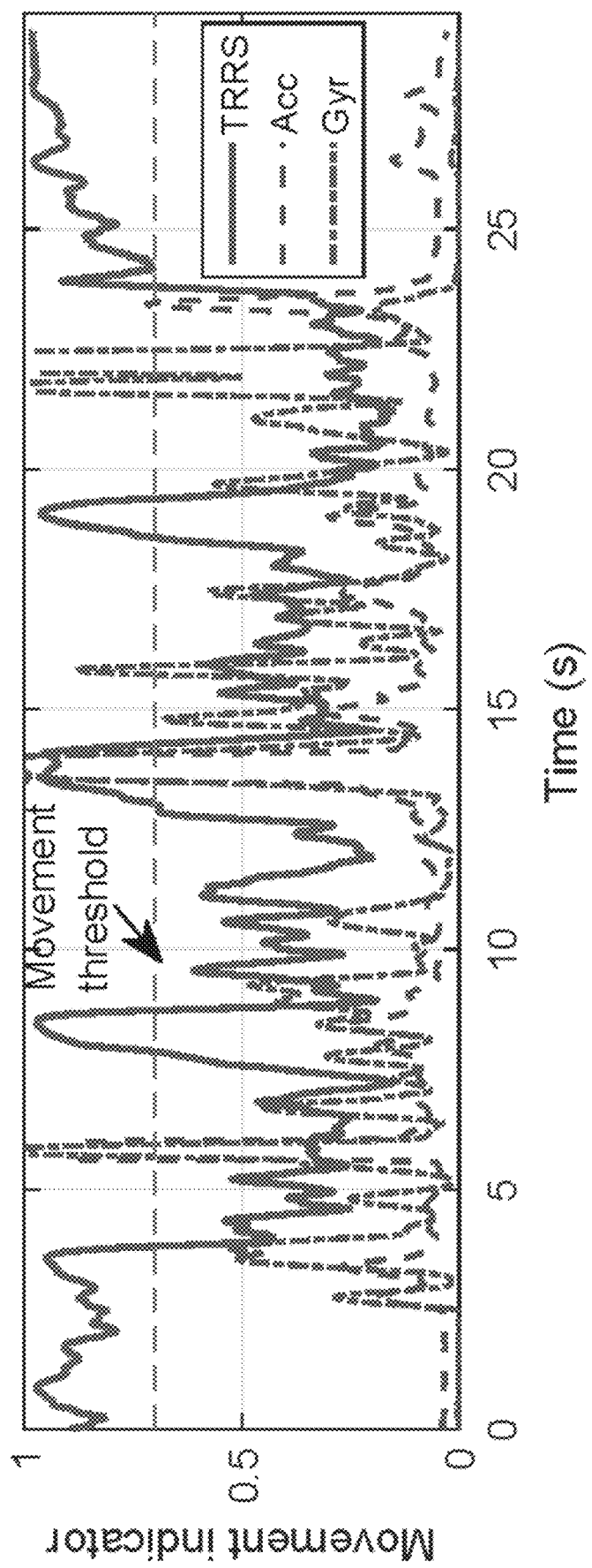
FIG. 7 illustrates exemplary experimental results of movement detection, according to some embodiments of the present disclosure.

Detecting Movement: One can detect antenna movement from TRRS with the virtual massive antennas, since TRRS is highly sensitive to arbitrary location changes. For movement detection, one may only need to examine the TRRS for one single antenna based on its own measurements. Specifically, one can calculate $\kappa(P_i(t), P_i(t-l_{mv}))$, the TRRS between the current measurement and the one $l_{mv}$ seconds ago, where $l_{mv}$ is the time lag chosen as a conservative period during which location would change by at least millimeters if motion happens. For example, if the antenna is moving at 1 m/s, a time lag of 0.01 second would expect a movement of 1 cm. FIG. 7 illustrates an example of a stop-and-go trace, where RIM is more robust than accelerometer (Acc) and gyroscope (Gyr) that both fail to detect the three transient stops during movements. Evidently, there is a clear gap between the TRRSs for movement and non-movement. Thus one can apply a threshold to detect movement, as indicated by the horizontal dashed line in FIG. 7.

Tracking Alignment Delay: Given an alignment matrix, one may need to identify the TRRS peaks of interests that indicate the time lags of antenna alignment. For an ideal case, one can pinpoint the time lags corresponding to the maximum values in each column of the TRRS matrix as the retracing delays. In practice, however, the maximum values could deviate from the true delays due to measurement noise, packet loss, or wagging movements, etc., and thus an approach is needed to robustly track the peak sequence corresponding to the alignment delays. To this end, the present teaching discloses a novel algorithm based on dynamic programming, which has been used to solve pitch tracking problems in signal processing. When applying in the disclosed case, however, it still needs elaborate design.

Figure 8A:
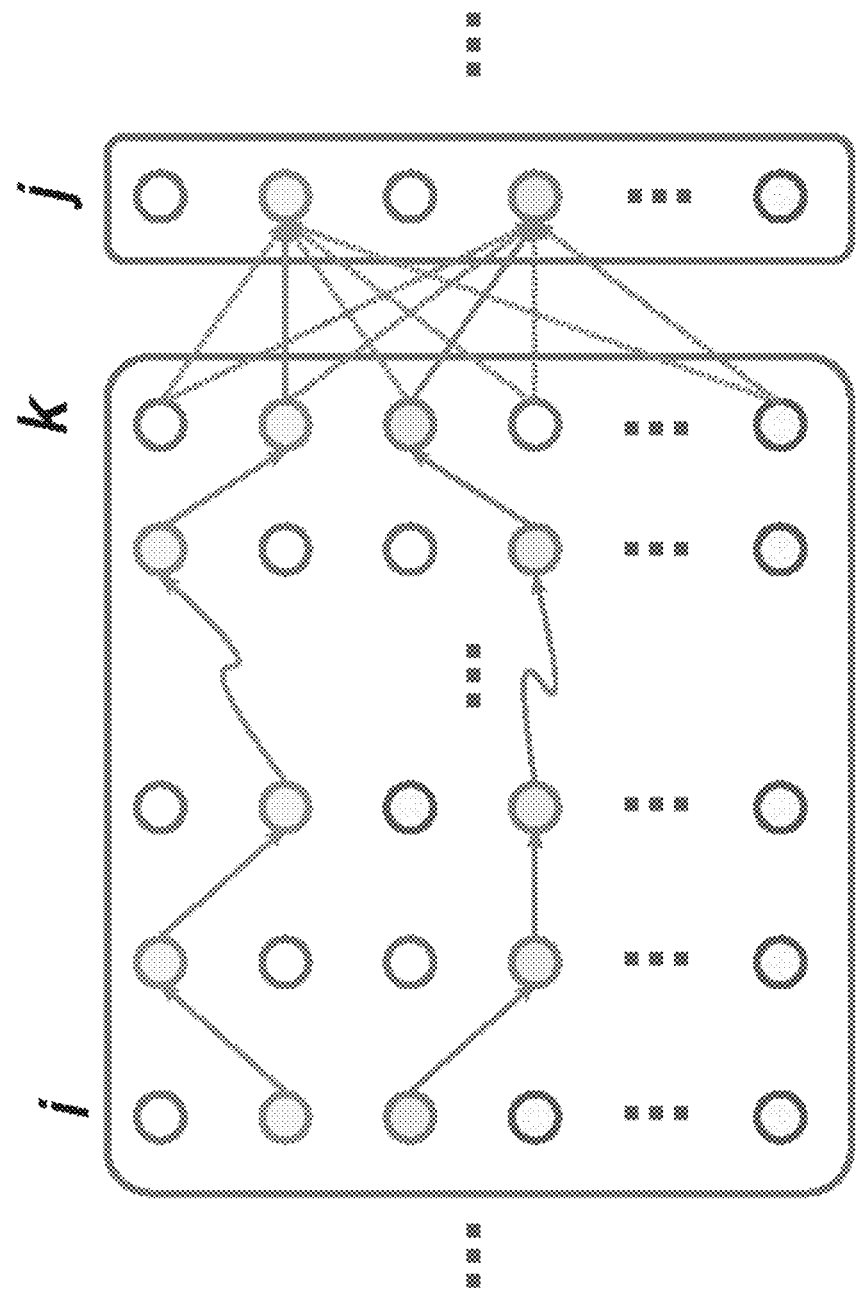
FIGS. 8A-8B illustrate exemplary experimental results of peak tracking, where alignment peaks are accurately and robustly tracked regardless of measurement noises and imperfect retracing, according to some embodiments of the present disclosure.

For clarity, one can simplify the notation of the TRRS matrix G for two antennas from time $t_1$ to $t_T$ as $Q=[q_{il}]$ where $q_i = q_{il}$, $i \in [1, T]$, $l \in [1, W]$. As shown in FIG. 8A, now suppose one wants to search the best path of the TRRS peaks from time point $t_i$ to $t_j$, denoted as $q_i \rightarrow q_j$. Define a score of the optimal path $q_i \rightarrow q_j$ that ends at point $q_{jn}$ as $S(q_i \rightarrow q_{jn})$. A disclosed approach is to search all W possible candidate paths $q_i \rightarrow q_{jn}$ that end at time lags $n \in [1, W]$ and then select the best one among all. Suppose all the optimal paths from $t_i$ to $t_k$ are available, each ending at point $q_{kl}$, $l \in [1, W]$, and the optimal paths from $t_k$ to $t_j$, each starting at $q_{kl}$ and all ending at $q_{jn}$, then one can have $$S(q_i \rightarrow q_{jn}) = \max_{l \in [1, W]} \{S(q_i \rightarrow q_{kl}) + S(q_{kl} \rightarrow q_{jn})\} \quad (6)$$

which stands for the score of the optimal path from $q_i \rightarrow q_{jn}$ since $S(q_i \rightarrow q_{kl})$ and $S(q_{kl} \rightarrow q_{jn})$ are both the scores of the respective optimal paths. When k=j−1, the score of the peak transition between subsequent columns $q_{kl}$ and $q_{jn}$ is calculated as $$S(q_{kl} \rightarrow q_{jn}) = e_{kl} + e_{ln} + \omega C(q_{kl}, q_{jn}) \quad (7)$$

where $e_{kl}$ and $e_{ln}$ are the TRRS value at $q_{kl}$ and $q_{jn}$ respectively. $C(q_{kl}, q_{jn})$ is the cost for stepping from $q_{kl}$ to $q_{jn}$ and is simply defined as $C(q_{ql}, q_{jn}) = \|l-n\|/L$. ω is a negative weighting factor for the cost. The designation of the cost function punishes jumpy peaks. The rationale is that in general cases the moving speed (thus the aligned delays) will not fluctuate too much within successive measurements.

Once having the scores for paths $q_i \rightarrow q_{jn}$ for any $n \in [1, W]$, the best path from $q_i$ to $q_j$ can be found as $q_i \rightarrow q_{jn*}$, where $$n^* = \arg\max_{n\in[1,W]} \{S(q_i \to q_{jn})\} \quad (8)$$

Figure 8B:
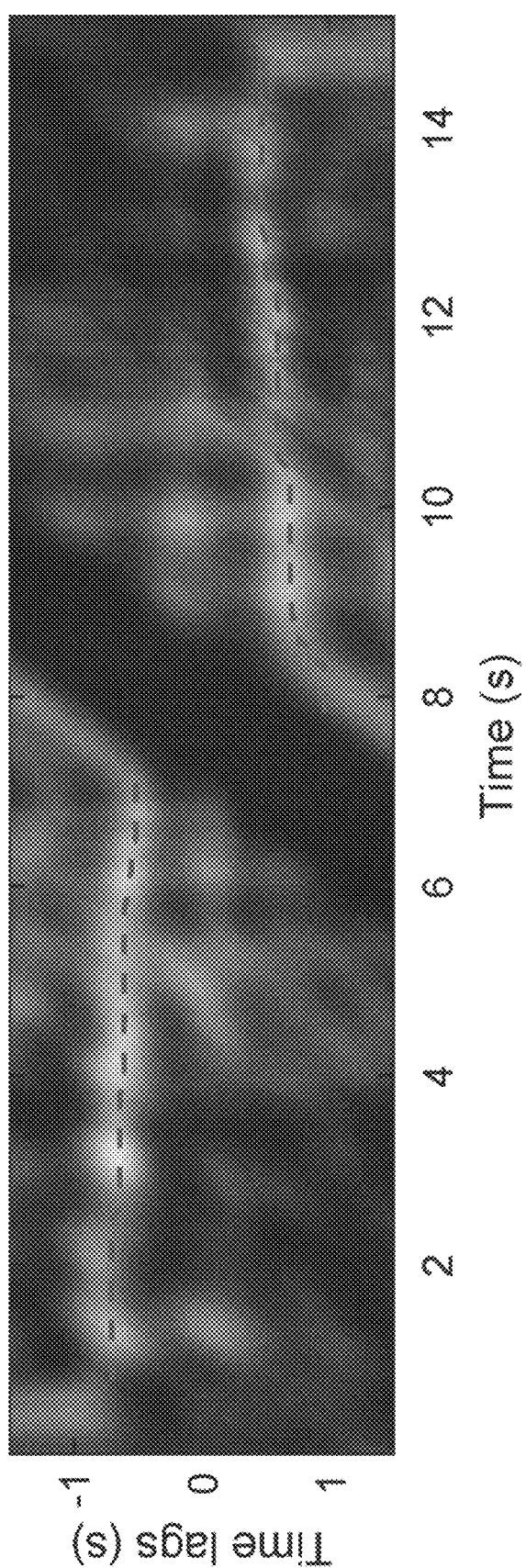

The entire path of peaks can then be easily identified by tracing back the previous steps from $q_{jn^*}$ until the starting point $t_i$. FIG. 8B depicts an example of the peak tracking results for a back-and-forth movement including two periods of alignment.

In principle, the above peak tracking should be performed on every pair. Two steps are taken to optimize the complexity: (1) Antenna pairs that are very unlikely to be aligned are skipped; (2) In the implementation with 6-element array, one can facilitate it by averaging the alignment matrix of parallel isometric antenna pairs (e.g., antenna pairs (1, 4) and (3, 6), (2, 4) and (3, 5) as in FIG. 2) and conduct peak tracking on the averaged matrix, which is augmented since the two pairs have the same alignment delays.

C) Detecting Aligned Pair: For the sake of robustness, one can detect aligned antenna pairs in two steps, a pre-check before peak tracking, and a post-check after that.

C. 1) Pre-detection: In practice, one can perform a pre-detection operation to preclude the unaligned pairs before peak tracking. In particular, for a specific period, one can consider only antenna pairs that experience prominent peaks most of the time as prospective candidates, and exclude the others that are unlikely aligned. The peak tracking is then only employed on the selected candidate pairs.

C.2) Post-detection: After peak tracking, one can obtain a path of identified peaks for each pair. One can then further examine the extracted paths, accounting for the continuity, TRRS values, smoothness, and orientations they indicate, to ultimately confirm the most likely aligned pairs.

D) Putting All Together: Suppose the i-th and j-th antennas are detected to be aligned at time t, with a separation distance of $\Delta d_{ij}$ and an alignment delay of $\Delta l_{ij}(t)$. Then one can measure the following results:

D.1) Moving distance: The moving speed v(t) at time t is derived as $v(t)=\Delta d_{ij}/\Delta l_{ij}(t)$. The moving distance can then be simply derived by integrating the instantaneous speed over time, i.e., $d(t)=\int_{0}^{t}v(\tau)d\tau$.

D.2) Heading direction: It is straightforward to obtain the moving direction when one can know the aligned antenna pairs. Specifically, θ(t) is assigned as the direction of the ray pointing from antenna i to antenna j if $\Delta l_{ij}(t) \geq 0$, and the opposite direction if $\Delta l_{ij}(t) < 0$.

D.3) Rotating angle: At a certain moment, if every adjacent pair of antennas is aligned simultaneously, then a rotation occurs. For a very short window, one can assume that the rotation happens in place. The angle of rotation is estimated from the rotated distance of each antenna as $\Delta\theta=R/r$, where r denotes the radius of the circular array and R is the arc length estimated by the rotating distance. In the case of in-place rotation, one can estimate an individual speed from each pair of adjacent antennas. Thus one can use the average speed for rotating distance calculation. The effective antenna separation for rotation becomes $$\frac{\pi}{3}\Delta d,$$

the arc length one antenna needs to travel to hit another. The above estimates are all smoothed and then integrated to recover the relative moving trajectory.

Packet synchronization and interpolation: RIM does not require phase synchronization among antennas. Due to potential packet loss, however, it is needed to synchronize CSI measurements (i.e., packets) on two NICs for cross-antenna mapping (and only needed for the implementation using two commercial NICs). In RIM, one can accomplish this by letting the AP broadcast packets, using it as a coarse external clock. In particular, two packets with the same sequence number are synchronized, since they are from the same broadcast packet on the AP and thus received simultaneously, ignoring the insignificant propagation delay. In case of packet loss, a null CSI is inserted.

RIM's packet synchronization is completely different from the requirements of precise phase synchronization of previous works which utilize phased array antennas for geometrical channel measurements. Instead, one may merely need packet-level synchronization, which could be skipped in the near future as one NIC will come with more antennas, e.g., 60 GHz chipsets.

Minimum initial motion: There is a minimum requirement on the initial moving distance or rotating angle below which RIM cannot measure the motion. The minimum moving distance is, intuitively, the separation distance Δd between the two antennas. From the moment of starting moving, only after a translation of at least Δd will a following antenna "hit" the leading antenna, for the first time. In practice, to reimburse this "blind" period, the estimated distance will be compensated by Δd. After moving for Δd, RIM further waits for a period of 2 W to calculate TRRS matrix, which is negligible with sufficiently high sampling rates.

Such minimum requirements on initial motion is different from RIM's motion resolution. Once two antennas are aligned for the first time, RIM will continuously and precisely track motion thereafter.

One may conduct experiments in an office environment to evaluate RIM, including system performance analysis and application study. One can deploy a single AP to cover the experimental areas of more than 1000 m². To demonstrate RIM's advantages in through-the-walls measurements, by default the AP is placed at the farthest location #0, a corner of the floor. One can conduct motion measurements at different locations over the floorplan (except for some areas where one may not have access), covering areas both near to, and far away (as far as 40 meters) from the AP. During the experiments, the AP keeps broadcasting packets at 200 Hz on a 40 MHz channel in the 5 GHz band.

To obtain ground truth, one can set up a camera-based tracking system. Specifically, the target may be marked with high contrast color and tracked by the cameras. The motion trace is first calculated in the pixel frames and then converted to 2D world coordinates. The outputs are synchronized with RIM's estimates by the initial point when the target starts moving and are pairwise compared subsequently. There might be slight time offsets, which do not favor the evaluation.

Micro Benchmarks: One can now evaluate the overall performance in estimating moving distance, heading direction, and rotating angle, and study how various factors impact the accuracy. Unless otherwise stated, the device is moving at a speed of about 1 m/s, and the lengths of traces for analysis all exceed 10 meters.

Figure 9:
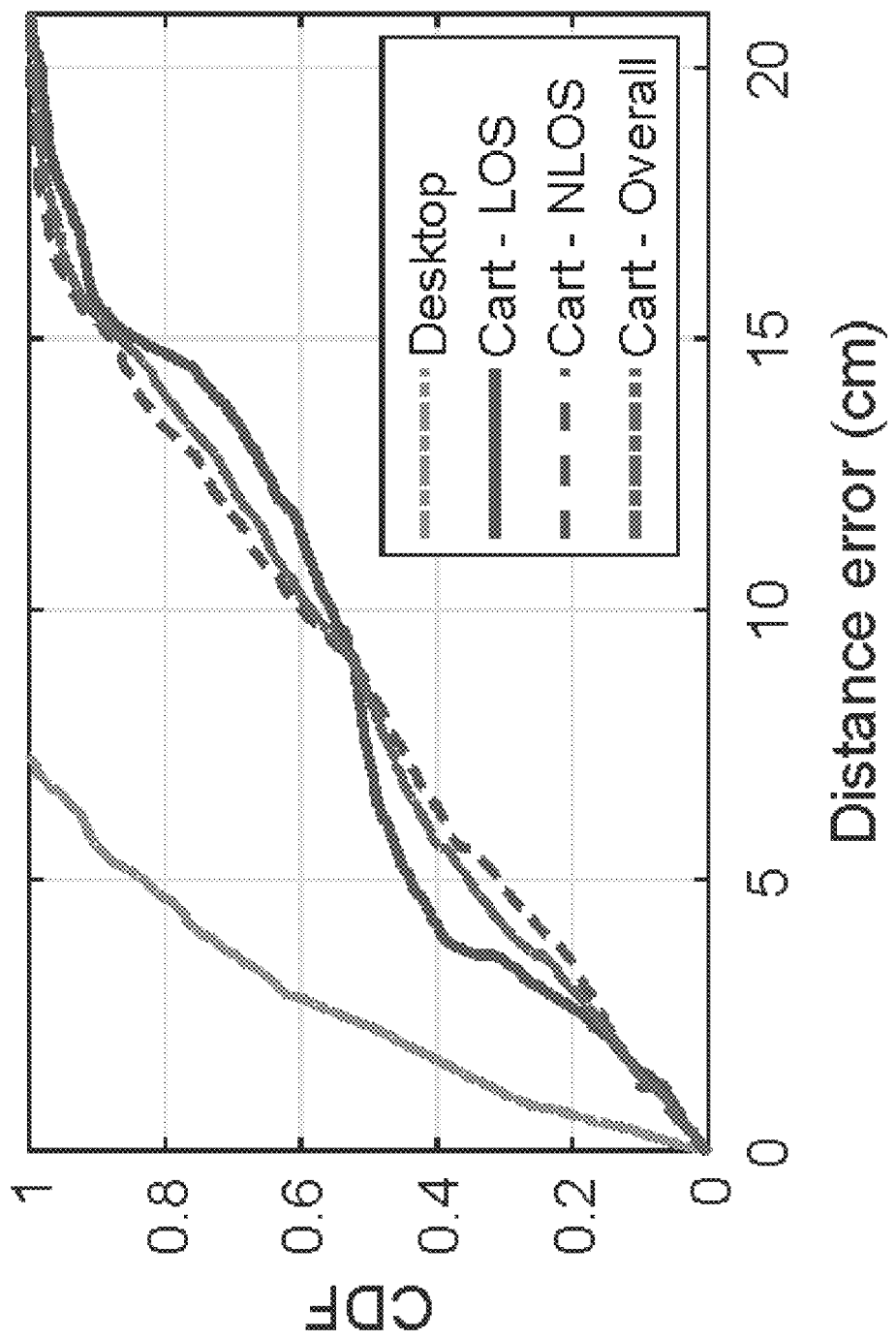
FIG. 9 illustrates exemplary experimental results of an accuracy of moving distance estimation, according to some embodiments of the present disclosure.

Accuracy of moving distance: To fully understand RIM's centimeter accuracy in moving distance estimation, one can use a 3-antenna linear array present in COTS WiFi and move it roughly along lines in two scenarios: 1) Desktop: one can move the array on a desk surface for traces around 1 m; 2) Cart: one can put the array on a cart and push it straight forward by more than 10 meters in different areas. As shown in FIG. 9, RIM achieves a median error of 2.3 cm for the more stable, thus better aligned, desktop moving. For the less controlled cart movement, it yields 8.4 cm median error. Specifically, it yields 7.3 cm median accuracy in LOS scenarios and, more importantly, a similar accuracy of 8.6 cm in complex NLOS conditions. The 90% tile and maximum errors are under 15 cm and 21 cm, respectively. Results using accelerometer are not included because it easily produces errors of tens of meters. No existing system can achieve comparable performance under similar settings (i.e., NLOS over a large area using a single unknown AP).

Figure 10:
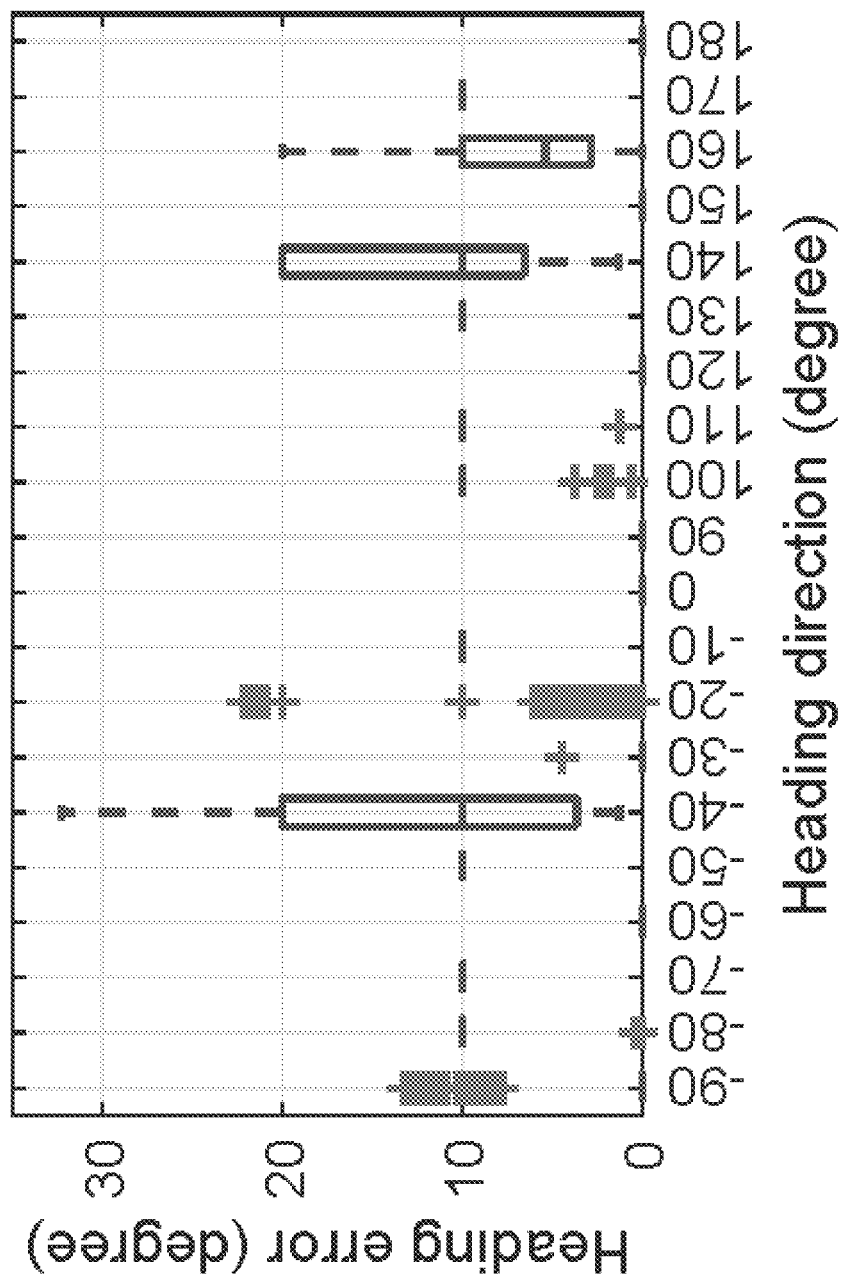
FIG. 10 illustrates exemplary experimental results of the estimated heading errors with respect to different heading directions, according to some embodiments of the present disclosure.
Figure 11:
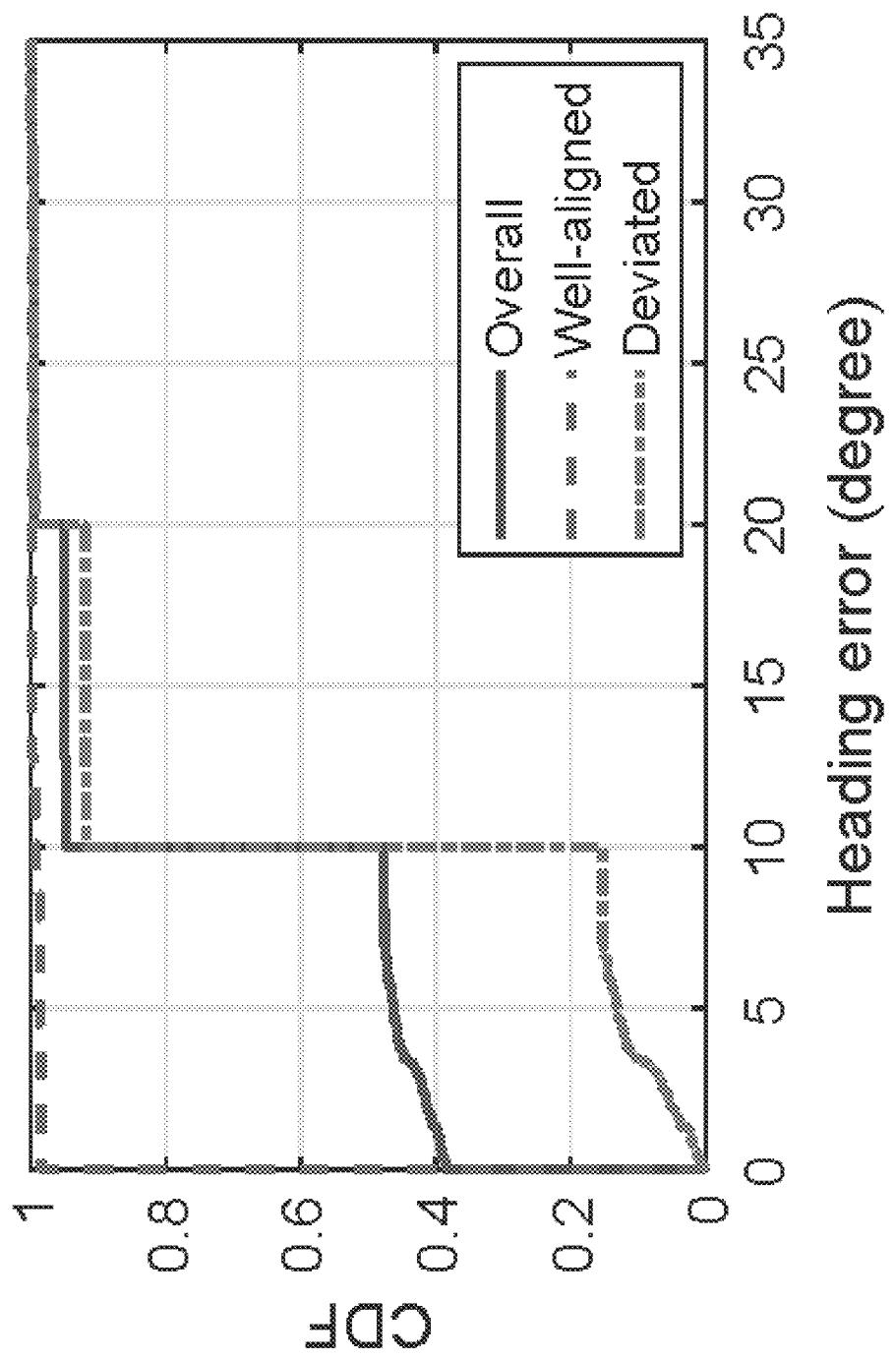
FIG. 11 illustrates exemplary experimental results of the cumulative distribution function of the heading errors, according to some embodiments of the present disclosure.

Accuracy of heading direction: One can study RIM direction measurement accuracy by moving the hexagonal array in diverse directions. In particular, one can traverse a 90° range with an increase step of 10°, together with each of their opposite directions. For each direction, one can move the device for about 1 meter and examine the heading direction estimation errors. As depicted in FIG. 10, RIM identifies the closest heading direction that it can resolve for most cases, except for a few outliers (e.g., in direction −40° and −20°). FIG. 11 further integrates the results for all directions, which shows that >90%/o of heading errors are within 10°, with an overall average accuracy of 6.1°. Most of the estimates are either correct without any error (e.g., well-aligned directions) or with 100 errors (e.g., deviated directions), because RIM resolves a set of discrete directions that are integral multiples of 30°. One may further demonstrate RIM's heading estimation performance for free movements in real applications. Again, magnetometer is not compared because it cannot address heading direction.

Coverage and impacts of AP locations: RIM works anywhere the AP signals can reach. To study whether AP location affects its performance, one can place the AP at different locations, and perform distance measurements in the middle open spaces. RIM achieves consistently high median accuracy of less than 10 cm for any AP location, being close as LOS or far away through multiple walls and pillars. The best-ever coverage allows RIM to work wherever there are WiFi signals.

Figure 18:
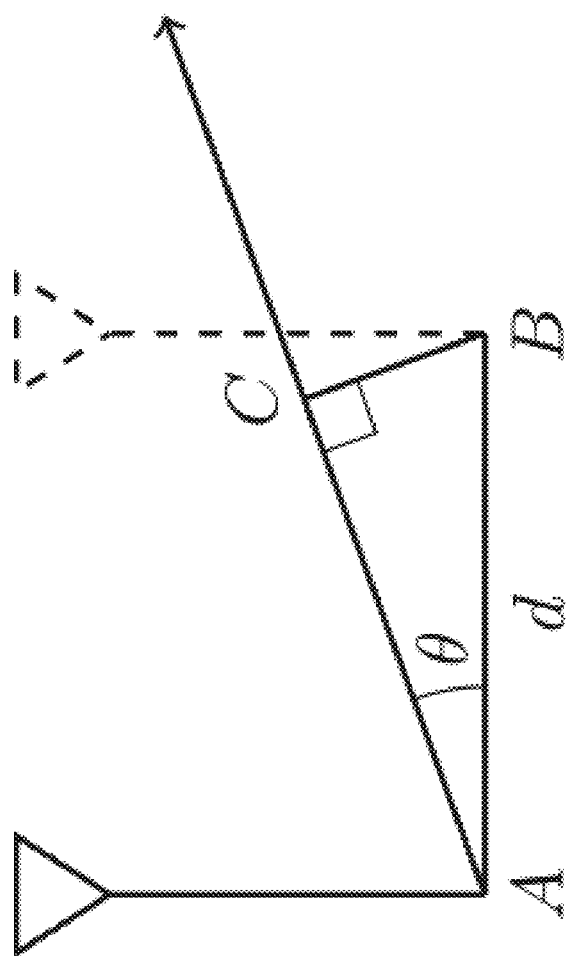
FIG. 18 illustrates an exemplary antenna moving trace, according to some embodiments of the present disclosure.

Impact of accumulative distance: Inertial sensors are known to suffer from accumulative errors over long trajectories. It is interesting to examine how RIM performs with respect to different movement lengths. Thus one can move for about 10 m for multiple times and calculate the tracking errors during trace progressing. As shown in FIG. 18, the median errors in moving distance vary from about 3 cm to 14 cm, which do not necessarily accumulate over long distances. The performance gains attribute to RIM's high precision in speed estimation, which does not drift over time.

Figure 16:
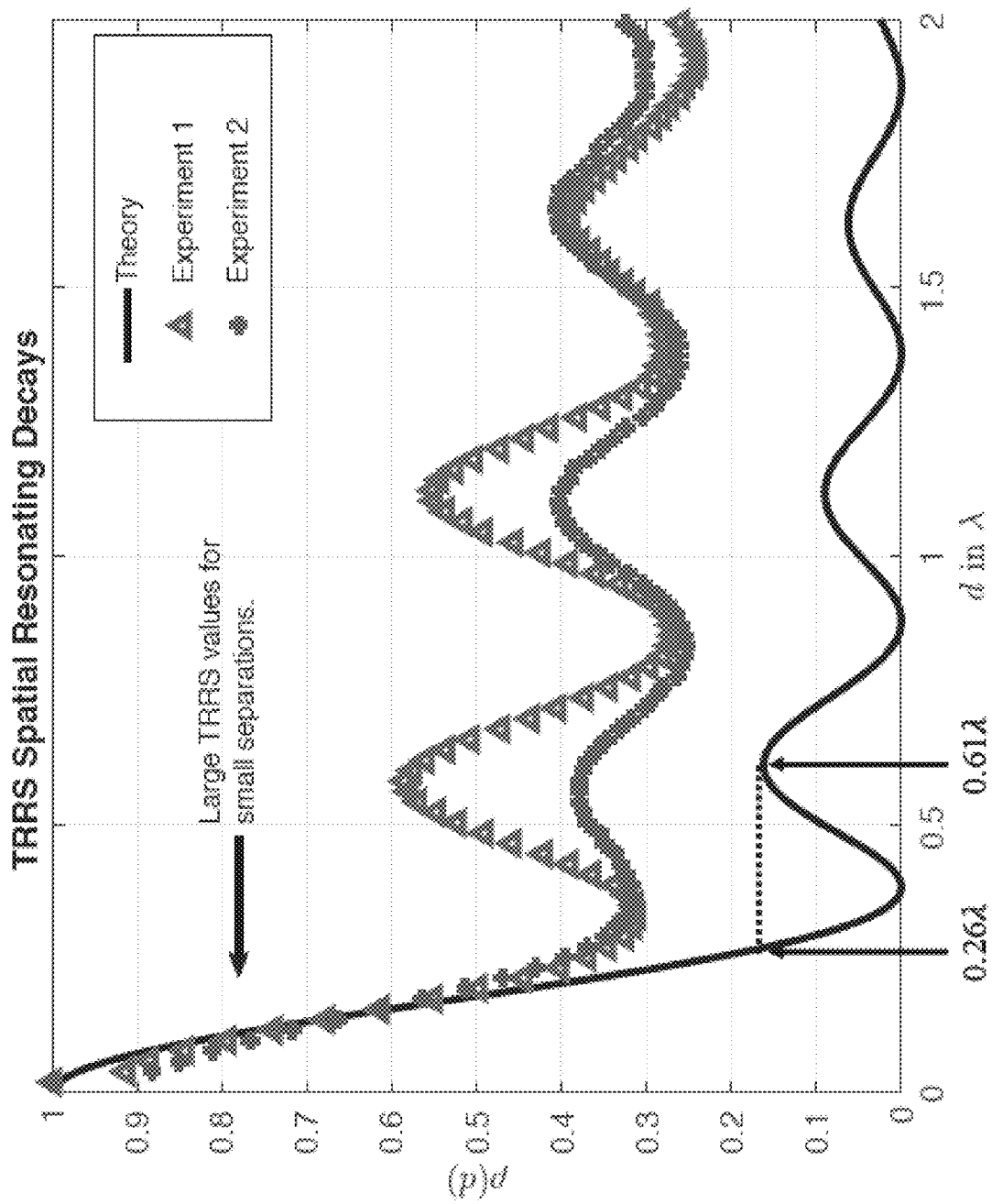
FIG. 16 illustrates an exemplary TRRS spatial decay, according to some embodiments of the present disclosure.

Impact of sample rate: Sufficient sampling rate is required to achieve high accuracy in RIM. Thus one can downsample the CSI from 200 Hz down to 20 Hz and rerun the distance tracking. The results are integrated in FIG. 16. As expected, the distance tracking accuracy increases with higher sampling rates. For a moving speed of 1 m/s, a sampling rate of 20 Hz or 40 Hz is not enough, which results in about a displacement of 5 cm per sample. To ensure sub-centimeter displacement within one sample, at least 100 Hz is needed for a speed of 1 m/s. A higher sampling rate will further improve the accuracy, yet the improvement would be marginal compared to the computation overhead incurred. In FIG. 16, the solid line shows the Bessel function curve in theory; the other two lines are from experiments. The peak locations of the experiment agree well with the theory. The separation distance of the first peak is at $0.61\lambda$, and TRRS value is large for small separations.

Figure 17:
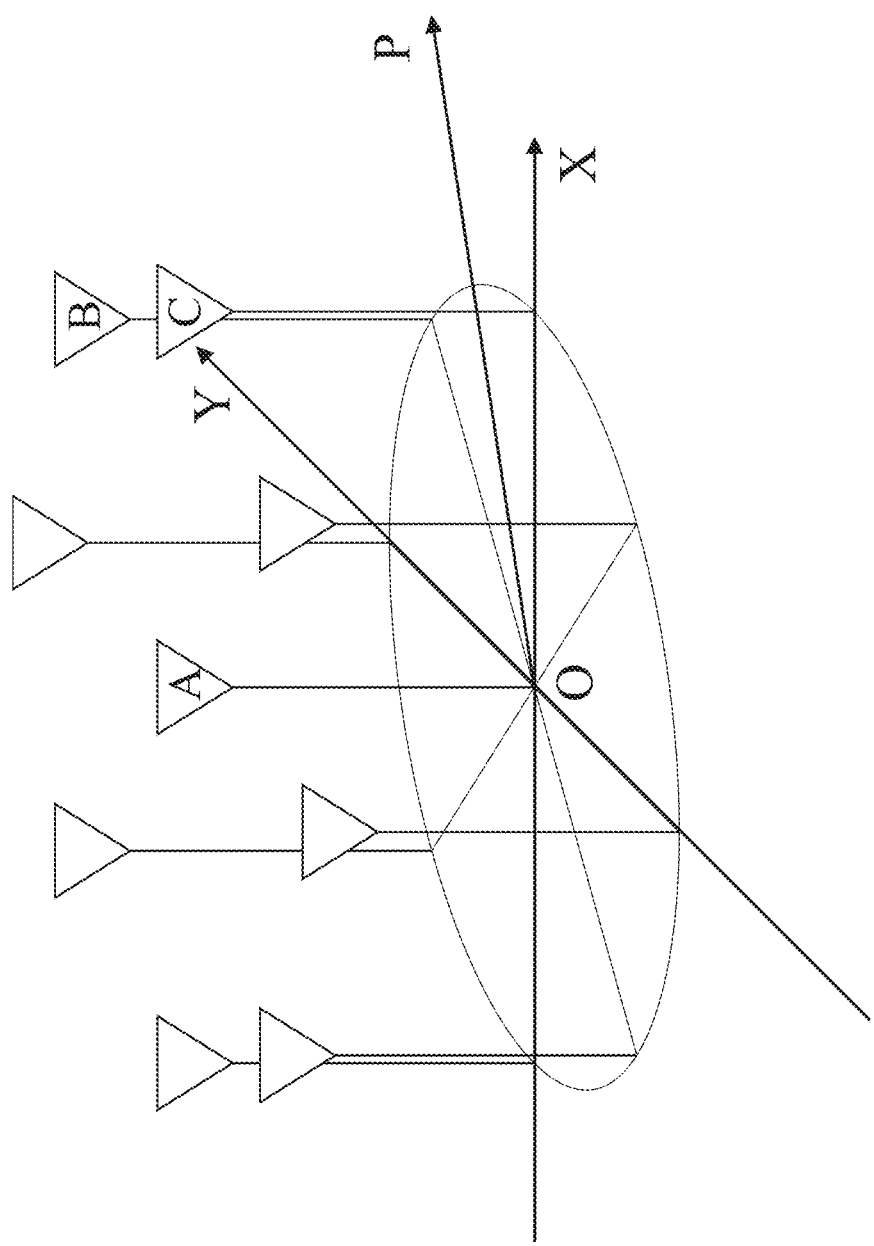
FIG. 17 illustrates an exemplary octagon antenna array for direction measurement, according to some embodiments of the present disclosure.

Impact of virtual antenna number: Using virtual massive antennas is a key to boost RIM's resolution. Thus one can study how the number of virtual antennas impact accuracy. As shown in FIG. 17, one can increase the virtual antenna number V from 1 to 100 and calculate the distance errors. The results show the median accuracy decreases from about 30 cm to 10 cm when V increases from 1 to 5, and further reduces to 6.6 cm when V=100. In practice, a number larger than 30 should suffice for a sampling rate of 200 Hz, and should be larger for higher sampling rate and smaller for lower.

Robustness to environmental dynamics: Building upon spatial multipath profiles, it is interesting to see if RIM is immune to common environmental dynamics, e.g., walking humans. For experiments, there are always at least two persons doing the experiments, in addition to others performing normal activities around the environment. Imagine when a user moves the device (e.g., pushing a cart), both his/her body and the cart are moving closely to the receiver, altering the multipath distributions. Yet the above results show robustness to these kinds of dynamics. The reasons are two-fold. 1) There are a number of multipaths indoors, coming from different directions. As a walking human will only change part of them, the TRRS behavior underpinning RIM still holds. 2) RIM does not rely on absolute TRRS, which may vary with environmental dynamics.

System complexity: The main computation burden lies in the calculation of TRRS. For every sample, RIM needs to calculate TRRS over a window of 2 W, leading to m×(m−1)×W values in total for an array of m antennas. Since the MATLAB code is not optimized for speed, one can measure the C++ system on Surface Pro, which is equipped with Intel Core i7 4650U and 8.0G RAM. RIM's core modules run in real-time, using around 6% of CPU and about 10M of RAM.

RIM has a range of potential applications in indoor tracking, handwriting, gesture control, movement detection, VR headset tracking, drone tracking, etc. One can evaluate RIM with three application scenarios as below.

Figure 12:
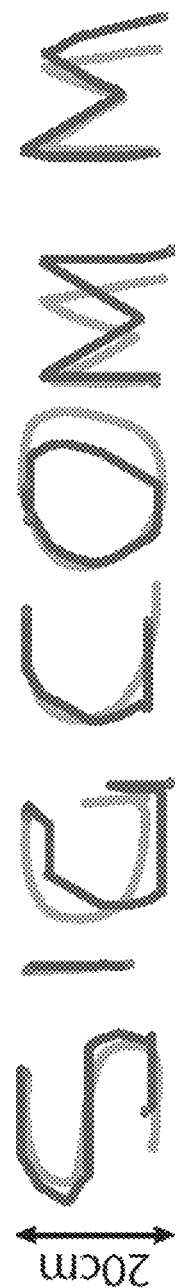
FIG. 12 illustrates exemplary handwriting characters recognized using RIM, according to some embodiments of the present disclosure.

1) Desktop Handwriting: With RIM precision in motion tracking, it supports handwriting on a whiteboard or desk. To show a proof-of-concept scenario, one can ask a user to move the antenna array by freely writing some letters on a desk surface. FIG. 12 depicts some examples of the recovered letters, with comparison to the ground truths captured by camera system. As seen, RIM reconstructs not only relatively straight segments but also curved strokes in different directions, resulting in recognizable letters. Albeit currently the antenna array may be too large to act as a "pen", one can demonstrate the disclosed technology will directly shape it for writing when smaller antennas with shorter wavelengths become ubiquitous in the near future.

Figure 13A:
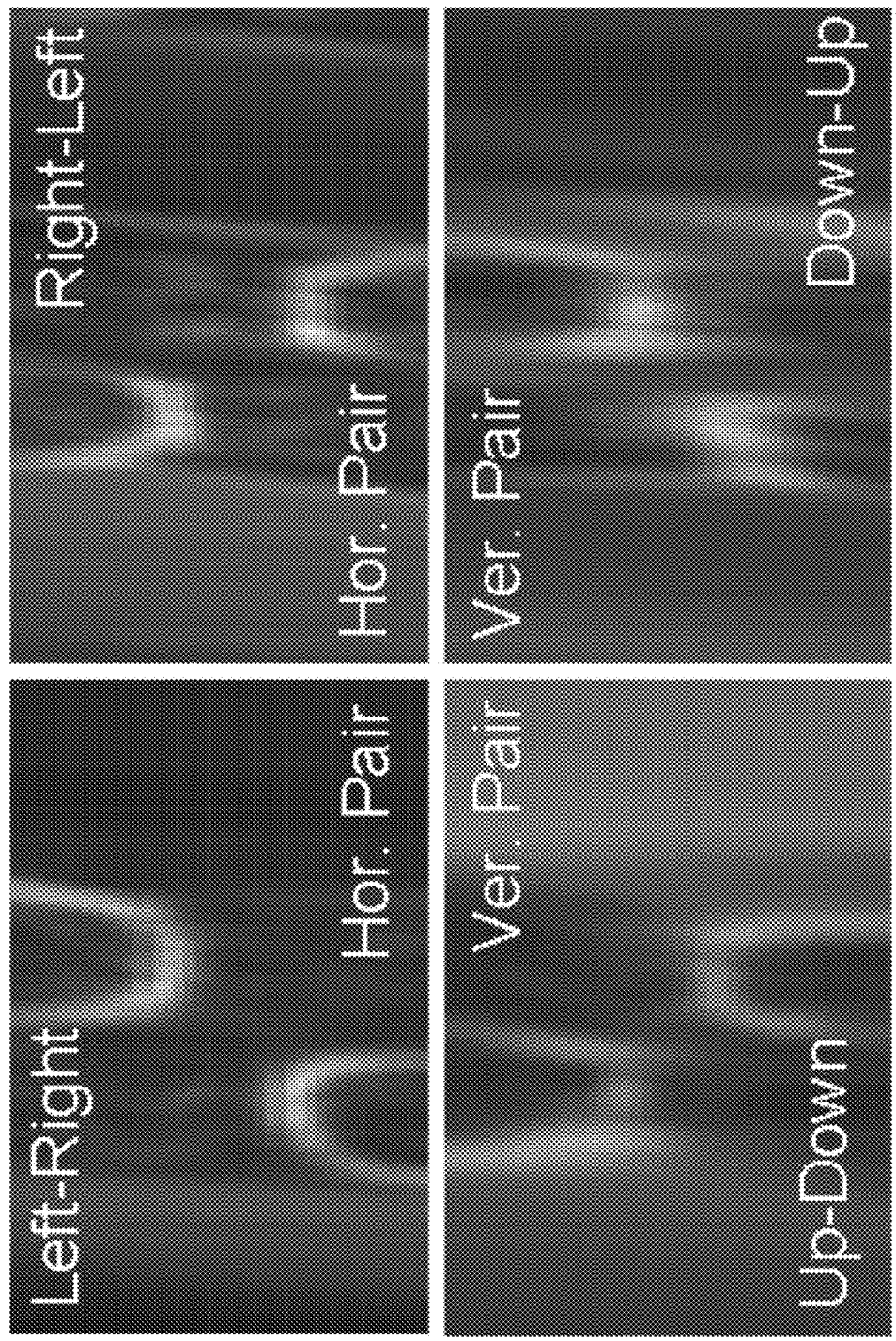
FIGS. 13A-13B illustrate exemplary experimental results of gesture recognition, according to some embodiments of the present disclosure.
Figure 13B:
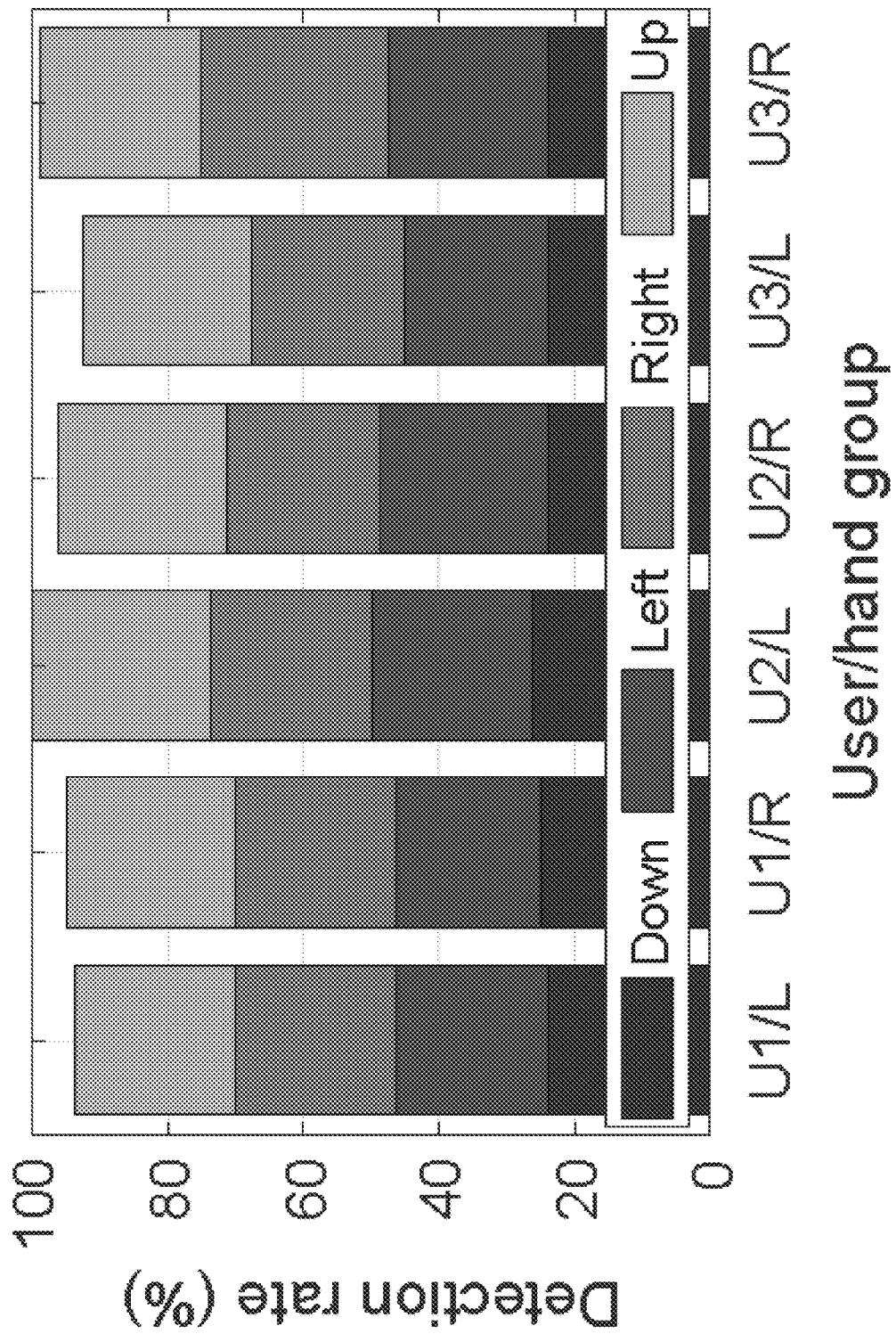

2) Gesture Recognition: One can demonstrate a gesture control application by integrating RIM as a pointer-like unit. To make it compact, one can use one WiFi NIC with three small chip antennas arranged in an "L" shape. The experiments involve three users, each performing four different gestures (moving towards left/right/up/down and then back) for 20 times with their left and right hand, respectively. In total, one can collect 480 actions for testing. As shown in FIG. 13A, different gestures produce distinct patterns in alignment matrices on certain antenna pairs. RIM observes a speed in one direction in which the user's hand moves towards, immediately followed by a speed in the opposite direction when the hand moves back, from a specific pair of antenna depending on the moving direction. One can use this information to detect and identify a gesture. FIG. 13B illustrates the recognition results of detection rates for three users with their left/right hands. Since all detected gestures are all correctly recognized, one can only plot the detection rates. As shown, RIM has an average detection accuracy of 96.25% for different gestures and users, with 23 miss detections (4.79%) and 5 false triggers (1.04%) over the total 480 tests. The false trigger rate is less than the miss detection rate, which is also favored in practical cases because one can simply repeat the gesture for miss detection while false trigger is annoying. Moreover, the performance is consistently high across different users and actions, and left/right hands. The results demonstrate promising gesture capability to be integrated in, e.g., a presentation pointer.

3) Indoor Tracking: One can particularly implement two different cases to extensively demonstrate RIM's capability for indoor tracking. During the tracking test, the AP is placed at location #0.

3.1) Pure RIM indoor tracking: One can first deploy RIM with a hexagonal array as a sole tracking system over the whole floorplan. The antenna array is put on a cart, which is pushed by a user along different specific traces. To particularly show RIM in the case of sideway movements (i.e., changing heading direction without turning), which are common in industrial Automated Guided Vehicles (AGVs), one can directly move the cart sideway, instead of making a turn, in this experiment. The trajectories are accurately tracked, even for very long traces over large areas. Conventional inertial sensors, gyroscope, and magnetometer, fail to capture such direction changes because there is no turning, meaning that the device orientation keeps the same although the heading direction has changed.

3.2) RIM with inertial sensors: RIM has superior advantages in moving distance estimation, even with only three antennas. To fully reveal its potential with COTS WiFi devices with only one NIC, one can implement a real-time system by integrating RIM's distance measurement with direction information reported by gyroscope. Specifically, one can use one Galileo Gen2 board equipped with one WiFi NIC of three chip antennas and the BNO055 sensor unit. The CSI collection and pre-processing are running on Galileo Gen2 while and RIM's algorithms are performed on a Surface Pro. One can also develop a GUI to display the tracking results.

One may test the integrated tracking system by putting the device on a cart and pushing it throughout the whole floor, as the way a customer pushes a shopping cart in a mall, or a smart home robot moves around. While the distances measured by RIM is highly accurate, the direction information obtained by inertial sensors may suffer from large errors. To put it into a practical system, one can further implement a particle filter (PF) to leverage the geometric constraints provided by the digital floorplan to handle direction errors caused by inertial sensors. The result, with particle filter based enhancement, gracefully reconstructs the real trajectory. Relying on only one single AP with unknown information, the encouraging results demonstrate the great potential of RIM enabling ubiquitous and accurate indoor tracking system especially for robots and objects, a long-standing challenging problem that has attracted numerous research efforts.

RIM is an early step towards ubiquitous and precise RF-based inertial measurements, and there is obviously room for continued research in various perspectives.

1) Antenna array: The current prototype of RIM has two COTS WiFi cards. As WiFi technology matures with many antennas and at higher frequency, e.g., 60 GHz, one single radio will be abundant and the size will be smaller.

2) Packet loss: Ideally, uniformly sampled CSI offers the best performance of RIM. In practice, RIM can tolerate packet loss to a certain extent by interpolation. However, a relatively clean channel is needed to ensure delightful performance.

3) Angle resolution: RIM exploits discrete directions defined by the antenna array (e.g., 300 resolution with a 6-antenna uniform circular array and will be enhanced by future many antenna radios). The TRRS decreases to different extents with respect to different deviation angles, so it is promising to investigate finer-granularity direction distinction in continuous space by leveraging the geometric relationship of adjacent antenna pairs.

4) Limitation of rotating angle: The current prototype of RIM can only sense in-place rotation, with only coarse resolution, and is not able to well monitor the rotating angle of swinging turns (i.e., move while turn). It remains open to explore more general and accurate angular motion measurement based on RIM's results. Furthermore, one can track movements during turnings by integrating inertial sensors, it is interesting to investigate simultaneous translational and rotational motions using RIM.

5) 3D motion: While RIM has better precision and robustness, it cannot measure 3D motion like traditional inertial sensors. Building specialized 3D array will break the limitation, which may be impractical in some scenarios but still valuable for special-purpose applications like drone tracking. Incorporating techniques based on TRRS may offer a distance estimation in arbitrary directions, without the need of a 3D array. The 3D direction, however, remains open for future research.

6) Fusing inertial sensors: RIM promotes inertial measurements especially for distance and heading estimation, which traditional inertial sensors can hardly measure. Nevertheless, gyroscope provides reasonably high rotating angles while magnetometer reports absolute orientation. Considering that inertial sensors almost always present alongside with WiFi radios, one can keep it as a future direction to fuse them together, by applying RIM to calibrate inertial sensors or incorporating gyroscope with RIM, which would boost ubiquitous inertial measurements for many applications such as indoor tracking and virtual reality.

The disclosed RIM, a precise inertial measurement system estimates centimeter moving distance, heading direction, and rotating angle using commercial WiFi radios. It works over a large multipath rich area wherever is covered by a single unknown AP that is arbitrarily placed, without support of additional infrastructure or sensors. By doing so, RIM opens up WiFi-based motion sensing to new applications demanding accurate and reliable motion measurements, such as robot monitoring, VR tracking, mobile gaming, etc.

Figure 14:
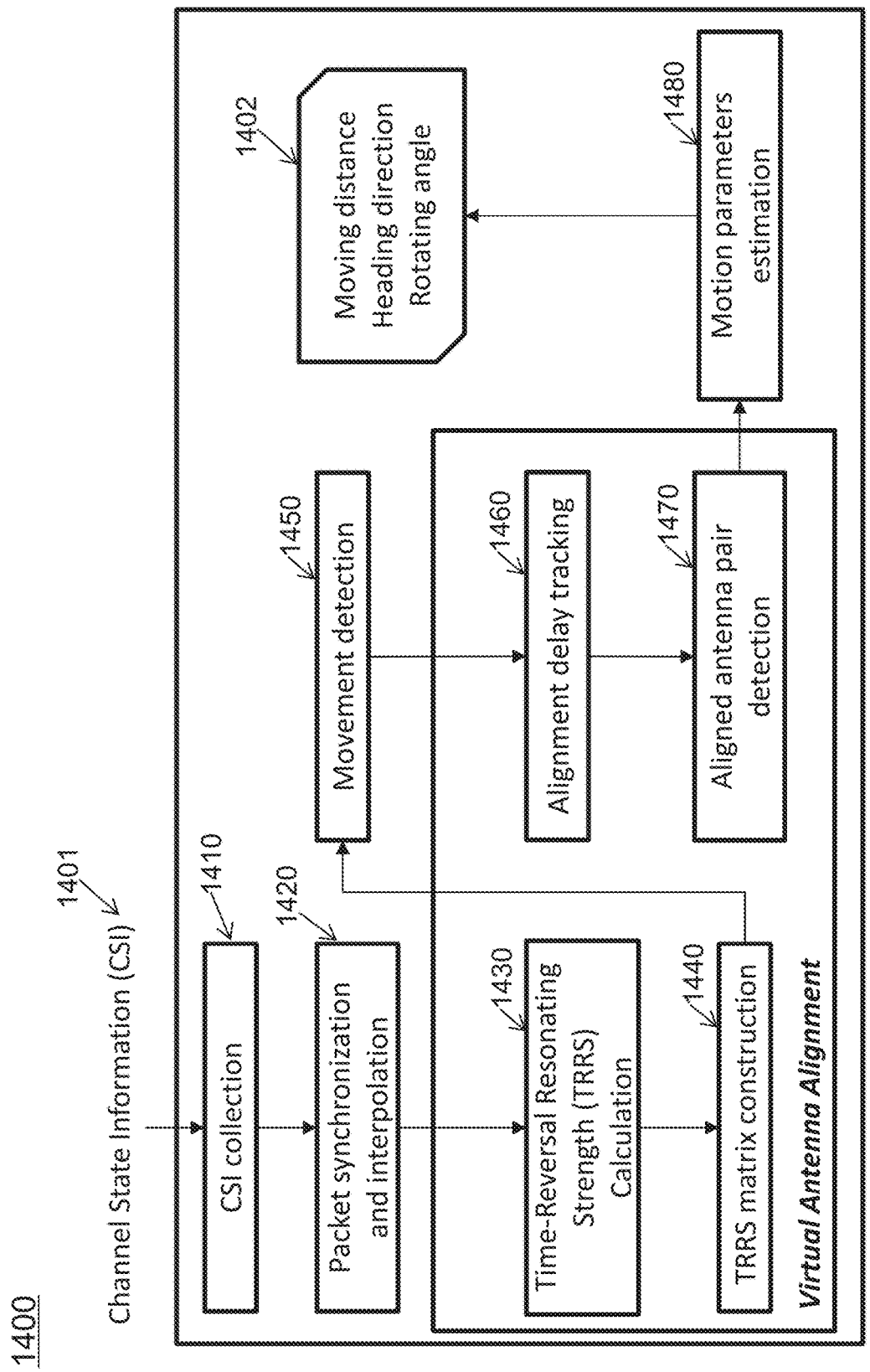
FIG. 14 shows a flowchart of a method for measuring multiple parameters of object motions, according to some embodiments of the present disclosure.

FIG. 14 shows a flowchart of a method 1400 for measuring multiple parameters of object motions, according to some embodiments of the present disclosure. As shown in FIG. 14, a CSI collection 1410 is performed by collecting CSI 1401, e.g. of a wireless multipath channel. Then a packet synchronization and interpolation is performed at operation 1420. The collected CSI is used to calculate a TRRS at operation 1430. A TRRS matrix is constructed at operation 1440. A movement detection 1450 is performed based on the TRRS matrix. Then an alignment delay tracking is performed at operation 1460; and an aligned antenna pair detection is performed at operation 1470. Motion parameters are measured or estimated at operation 1480 to generate estimates of motion parameters 1402, e.g. moving distance, heading direction, rotating angle, etc. As such, parameters related to a detected motion of an object can be measured based on a virtual antenna alignment technology. According to various embodiments, the order of some operations in FIG. 14 may be exchanged.

Figure 15:
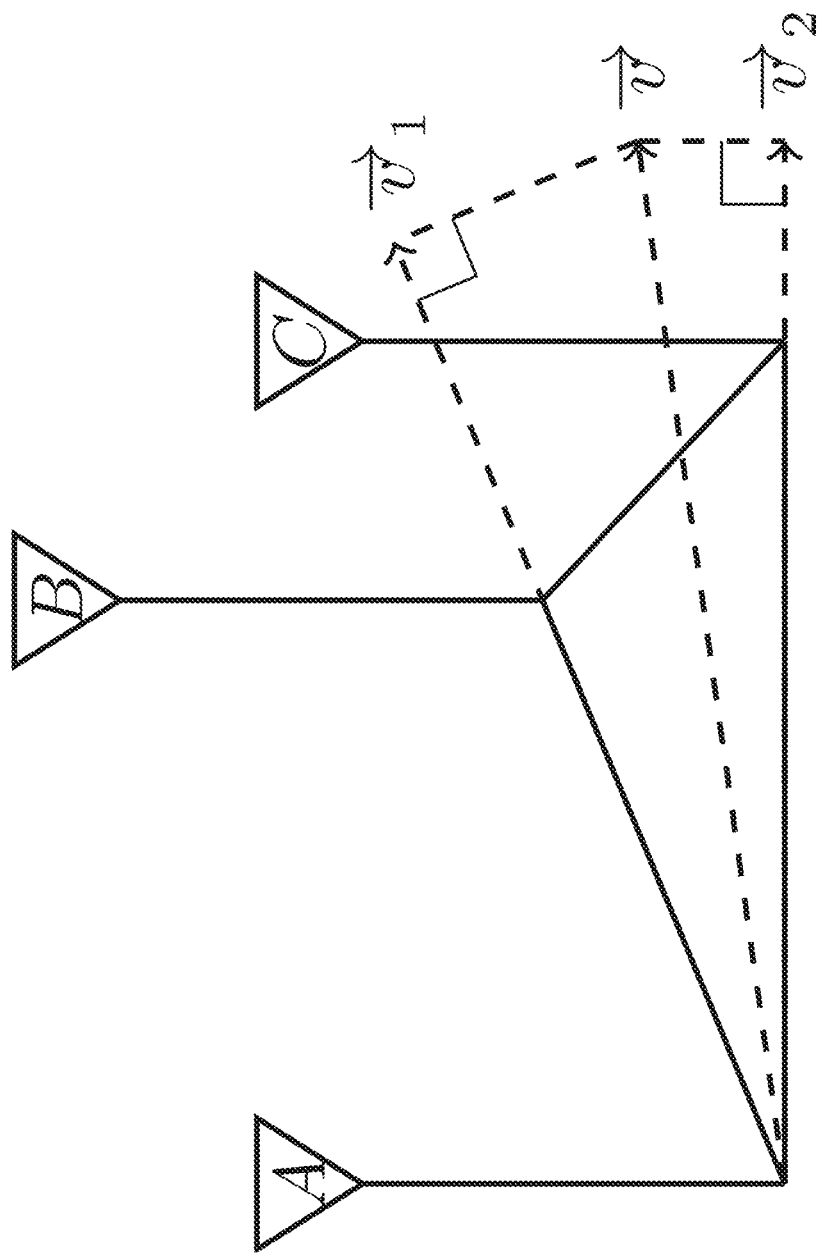
FIG. 15 illustrates an exemplary RF based inertial measure unit configuration with 3 antennas, according to some embodiments of the present disclosure.

In a first example, an RF-based inertial measurement can utilize a technique of virtual antenna alignment (VAA) to infer moving speed, direction, and rotating angle. Albeit high precision has been achieved for moving speed, the resolutions in moving direction and rotating angle are not yet optimized. In the following, one can boost the accuracy in moving direction and rotating angle estimation by making use of multiple speed estimates along different aligned antenna pairs. Combining the speed estimates with the known and fixed geometric relations of the antenna array, one can design a novel moving direction estimation algorithm that has continuous resolution with high accuracy. As a simple illustration shown in FIG. 15, the moving direction of the antenna array is close to the directions of $\overrightarrow{AB}$ and $\overrightarrow{AC}$ so that antenna pairs AB and AC are roughly aligned, from which the velocities $\vec{v}_1$ and $\vec{v}_2$ can be estimated using VAA. The moving direction of the device's overall velocity $\vec{v}$ can be derived from the geometric constraints between $\overrightarrow{AB}$ and $\overrightarrow{AC}$.

To ensure the existence of aligned antenna pairs for any heading direction, a novel 2D antenna array can be designed. The spatial decay property of the time reversal resonating strength (TRRS) is used to guide the design of the 2D antenna array. Based on the spatial decay curve of the TRRS, the antenna pairs that are close to each other before and after the rotation can be inferred from the highest TRRS values. Then, according to the antenna array geometry, the in-place rotation angle can be calculated at a high accuracy without drifting errors.

Experiments in a floor of busy office space, under strong NLOS environment with rich multipaths, verify the accuracy of the disclosed algorithms: the median error for moving direction estimation is 6.9°, which outperforms the accelerometer counterpart. The mean error for rotation angle estimation is 16.6°, which is comparable with the gyroscope, and much better in the long run without drifting errors. The promising performance and low cost make the disclosed direction finding method suitable for applications that need accurate direction information.

Given two CSIs $H_1$ and $H_2$, the time reversal resonating strength (TRRS) is defined as:

$$\rho(H_1, H_2) = \frac{|\langle H_1, H_2 \rangle|^2}{|H_1|^2 |H_2|^2}, \tag{9}$$

where $\langle x,y \rangle$ denotes the inner product of complex vectors x and y, and $|\cdot|$ is the magnitude operator. Notice that $\rho(H_1, H_2) \in [0,1]$, and it achieves 1 if and only if $H_1 = cH_2$, where c is a non-zero complex scaling factor. Thus, TRRS can be used as a similarity metric between CSIs.

For two CSIs $H_1$ and $H_2$ measured at a separating distance d, their TRRS can be approximated as a determinate function:

$$\rho(H_1, H_2) \approx J_0^2\left(\frac{2\pi}{\lambda}d\right), \tag{10}$$

where $J_0(x)$ is the zeroth-order Bessel function of the first kind, and $\lambda$ is the wavelength. The theoretical and measured TRRS spatial decay curves are shown in FIG. 16. Due to the asymmetric normalized energy distribution of MPCs in certain directions, the actual TRRS is a superposition of $$J_0^2\left(\frac{2\pi}{\lambda}d\right)$$

and some unknown function. Nevertheless, the damping pattern (locations of local minima and local maxima) agrees well with the theoretical Bessel function result. Hence, the moving speed can be calculated from dividing the identified first peak position by the corresponding time lag Based on the TRRS spatial decay curve, a novel moving direction estimation algorithm is disclosed. To better illustrate the disclosed algorithm, one can first introduce a method to identify the nearest location of a moving antenna to a given position (whose CSI is known). Then, a two-dimensional antenna array is designed for the purpose of super-resolution moving direction estimation, and a mechanism for selecting best aligned antenna pairs is given. Finally, making use of the geometric relations of the antenna array, the disclosed high accuracy indoor object moving direction estimation algorithm is explained in detail.

A two dimensional circular antenna array, where one additional antenna is at the center, and the reference coordinate system are shown in FIG. 17. With the number of antennas on the periphery being $n_{per}$, the circumferential angle between adjacent peripheral antennas is $\alpha = 180°/n_{per}$.

For the moving direction estimation, denote the moving direction as OP. There are several pairs of antennas whose traces are close to each other, which are denoted as aligned antenna pairs, where 3 antennas A, B, C are taken for illustration.

Denote the CSIs measured by those antennas at time t as $H_A(t)$, $H_B(t)$ and $H_C(t)$. For the CSIs collected at the same time, the corresponding separations between antenna AB, and antenna AC are both the radius, which is chosen as half the wavelength. From the TRRS spatial decay curve in FIG. 16, the TRRS values $\rho(H_A(t), H_B(t))$ and $\rho(H_A(t), H_C(t))$ are small. In one embodiment, antenna A keeps moving and collecting CSIs along the heading direction $\overrightarrow{OP}$. At time $t+\delta_{AB}$, the antenna A is closest to the location of antenna B at time t, thus $\rho(H_A(t+\delta_{AB}), H_B(t))$ yields a large value. Similarly, one can obtain a large value for $\rho(H_A(t+\delta_{AC}), H_C(t))$. From the large TRRS values, one can infer that the moving direction is close to the directions indicated by $\overrightarrow{AB}$ and $\overrightarrow{AC}$. Hence, by identifying antenna pairs with high TRRS values, the rough heading direction is determined by the selected antenna pairs. The details are revealed below for finding the correct antenna pairs.

Furthermore, utilizing the time antenna A takes to reach the closest locations to antenna B and antenna C, namely $\delta_{AB}$ and $\delta_{AC}$, one can refine the direction estimation together with the geometry of the 2D antenna array, which will be explained later.

For the in-place rotation angle estimation, assume the antenna array rotates about a clockwise. There are several pairs of antennas whose ending locations are close to the starting locations. Taking antennas B and C as an example, the ending location of antenna B is close to the starting location of antenna C, thus the TRRS between them should yield a large value. For different rotation angles, the pairs of antennas with high TRRS values will vary accordingly. By calculating the TRRS values between the CSIs collected at the beginning and after rotating, the rotation angle can be estimated using the high TRRS values and the geometric relations of the antenna array.

As illustrated in FIG. 18, the moving antenna, of which the initial location is A, moves along the trace $\overleftarrow{AC}$. The reference location is B, whose CSI $H_B$ is measured by another antenna in advance. The distance between A and B is d, and the angle $\angle BAC$ is $\theta$. Let $H_A(t)$ denote the CSIs measured by the moving antenna, and time $t=0$ be the moment it starts moving.

From a geometric point of view, the nearest point on the moving trace to the reference location is the projection of B onto the moving trace, namely the point C. To identify this closest location using CSI measurements, it is best to have CSIs at closest locations exhibit highest level of similarity, i.e., largest TRRS. If this is the case, the CSI at point C, $H_C$, can be directly inferred from the largest TRRS:

$$H_C = \arg\max_{H_A(t)} \rho(H_A(t), H_B), \quad (11)$$

and the time instance at the nearest location can be extracted from $H_C$ accordingly.

From the theoretical TRRS spatial decay curve, however, the nearest geometric location does not always imply highest level of similarity in CSIs. To make such an implication holds, there is a constraint on the initial distance d and the angle $\theta$. The principle is that the TRRS at the nearest location should be higher than that of the first peak at 0.61$\lambda$, which means, equivalently, the closest distance must be less than 0.26$\lambda$:

$$d\sin(\theta) < 0.26\lambda \quad (12)$$

For $d=\lambda/2$, $\theta$ should be less than 31°. Eqn. (12) serves as a guidance on designing the two-dimensional antenna array in the following.

Figure 19:
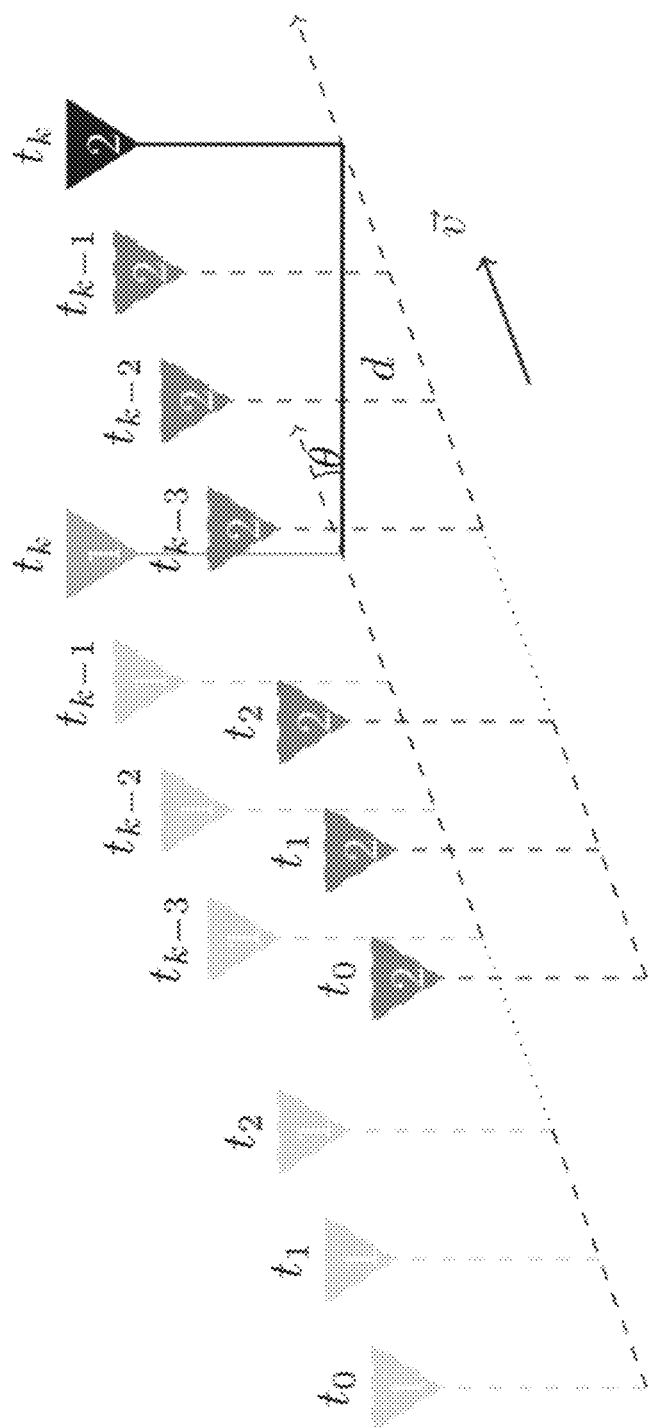
FIG. 19 illustrates another exemplary antenna moving trace, according to some embodiments of the present disclosure.

Before introducing the two-dimensional antenna array, a linear array composed of two antennas with a separating distance d is studied first. Assume the array is moving with a deviation angle $\theta$ relative to its orientation, as shown in FIG. 19. Let the CSIs of the two antennas measured along the way be $H_1(t_i)$ and $H_2(t_i)$, where i=0, 1, 2, . . . , k represents the sampling index. From the previous discussion, if the deviation angle $\theta$ is small enough, the largest TRRS should map to the nearest location to a reference point. In other words, given the reference location as the position of antenna 2 at time $t_i$, the time delay antenna 1 takes from time $t_i$ to the closest location can be calculated as:

$$\Delta t = \arg\max_{\Delta t} \rho(H_1(t_i + \Delta t), H_2(t_i)), \quad (13)$$

where $\Delta t$ can be a negative value (if antenna 2 is moving towards antenna 1).

If the antenna separation d and deviation angle $\theta$ are known, the moving distance l can be derived from the geometric relation: $l=d\cos(\theta)$, as illustrated in FIG. 18. Making use of the corresponding time delay $\Delta t$, the velocity v is further obtained by:

$$v = \frac{d\cos(\theta)}{\Delta t}, \quad (14)$$

which is important for the direction estimation below.

To find out the time delay $\Delta t$, a TRRS vector $g(t_i)$ is calculated through a window of length 2W+1 centered at $t_i$:

$$g(t_i) = [\rho(H_1(t_{i+j}), H_2(t_i)), j=-W, \ldots, W]^T, \quad (15)$$

where T denotes the transpose operator. The window length is decided by the antenna separation, moving speed and the sampling rate. If the speed is too slow, the peak index would lie out of the W=50 window length; if the speed is too fast, the peak index would be 0. In general, $$\frac{1}{samplingRate} < \frac{d}{v} < \frac{W}{samplingRate},$$

where d denotes the antenna separation.

To find out the time delay at every time index, a TRRS matrix G is formed by concatenating the TRRS vectors:

$$G = [g(t_1), g(t_2), \ldots, g(t_T)]. \quad (16)$$

Then, the time delay vector d(G) can be calculated as:

$$d(G) = [\arg\max g(t_i) - W, i=1, 2, \ldots, T]^T, \quad (17)$$

and the $i^{th}$ element d(G, i) is the time lag at time $t_i$.

Figure 20:
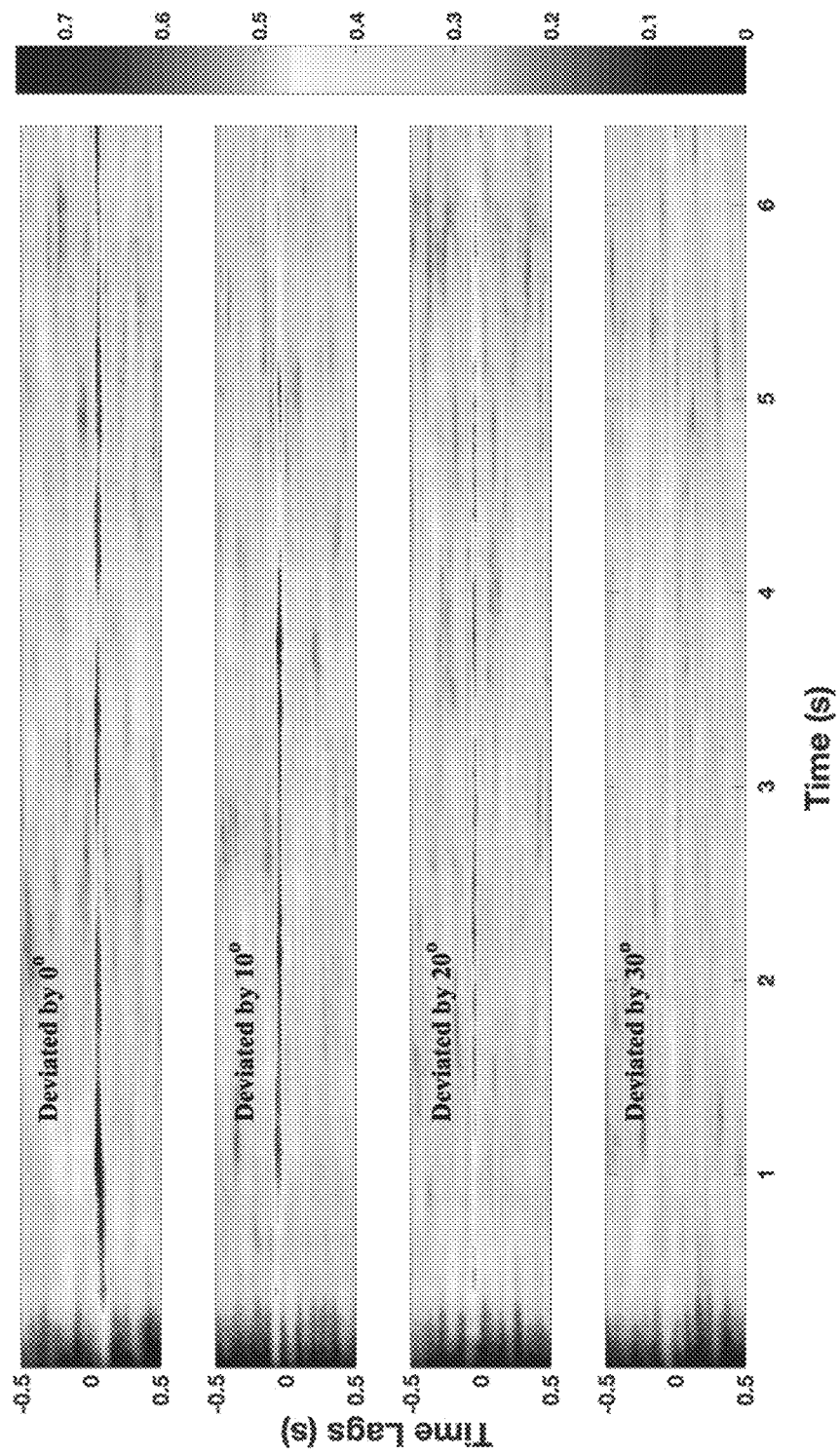
FIG. 20 illustrates an exemplary deviation, according to some embodiments of the present disclosure.

FIG. 20 shows the TRRS matrices for deviation angles 0°, 10°, 20° and 30°, of which the data is collected using two antenna $$\frac{\lambda}{2}$$

way from each other. From Eqn. (12), the deviation angle should be less than 31° to yield a maximum TRRS at the nearest location, which means a peak at each column of the TRRS matrices. Clear peak traces across time exist for deviation angles 0°, 10° and 20°. For 30°, however, the peak trace is hard to find because of the asymmetric energy distribution of MPCs and noise.

Based on both the theoretical and experimental results, a two-dimensional antenna array is designed for the purpose of high accuracy, super resolution moving direction estimation. The designed antenna array is shown in FIG. 17, where eight antennas are uniformly placed on a circle with a radius of half the wavelength, and one antenna is placed at the center.

The circumferential angle between adjacent peripheral antennas is denoted as $\alpha=22.5°$. The reasons behind the design are the following. 1) To measure the moving direction and the rotation angle in [0°, 360°), a circular array is chosen because of the symmetric geometry. 2) For the purpose of high resolution, an octagon array is used based on the peak traces result of TRRS matrices demonstrated in FIG. 20. Consider the directions formed by all the antenna pairs in the array, which are from 0° to 360° with an increment of $\alpha=22.5$. As shown in FIG. 20, clear peak traces can be observed in the TRRS matrices with a deviation around 20°. Thus, for any arbitrary moving direction, the best aligned antenna pair can be identified, yielding a high resolution of $\alpha=22.5°$. 3) For the purpose of super resolution and high accuracy, one additional antenna is introduced to leverage the geometric relations of the array. By placing one antenna at the center, it is guaranteed to have at least two aligned pairs of antennas, forming different directions, for any moving direction. Thus, the continuous resolution of moving direction can be achieved by utilizing the speed estimates and geometry of the aligned pairs, which will be explained below.

The aligned antenna pairs are those whose orientations are close to the moving direction. By correctly detecting best aligned antenna pairs, the moving direction can be inferred in the vicinity of the directions formed by best aligned antennas. The TRRS matrix is utilized for this purpose: the clearer the peak trace is, the better the alignment of antennas will be. To determine clear peak traces, a peak trace score of a TRRS matrix G is defined as:

$$s(G) = e(G) - \alpha \sigma(G), \tag{18}$$

where e(G) is the averaged energy of the peak trace:

$$e(G) = \frac{1}{T} \sum_{i=1}^{T} \max(g(t_i)), \tag{19}$$

and $\sigma(G)$ is the standard deviation of the time lags in the peak trace:

$$\sigma(G) = \sqrt{\frac{\sum_{i=1}^{T} (d(G, i) - \bar{d}(G))^2}{T - 1}} \tag{20}$$

$\bar{d}(G)$ is the mean of the time delay vector:

$$\bar{d}(G) = \frac{1}{T} \sum_{i=1}^{T} d(G, i) \tag{21}$$

$\alpha > 0$ is a scaling factor weighting the importance between energy and coherence of a peak trace.

Making use of the score s(G), the best aligned antenna pairs are selected with highest scores. Denote a(G) as the direction corresponding to the TRRS matrix G. Different antenna pairs may have the same orientation and form the same direction, thus one can further define the score of a given direction $\phi$ as the maximum one:

$$s(\phi) = \max_{a(G) = \phi} s(G) \tag{22}$$

Estimating the moving direction includes two steps: 1. Determine a rough angle range based on best aligned antenna pairs; 2. Estimate the direction within the range using geometric relations to achieve super resolution and high accuracy.

Figure 21:
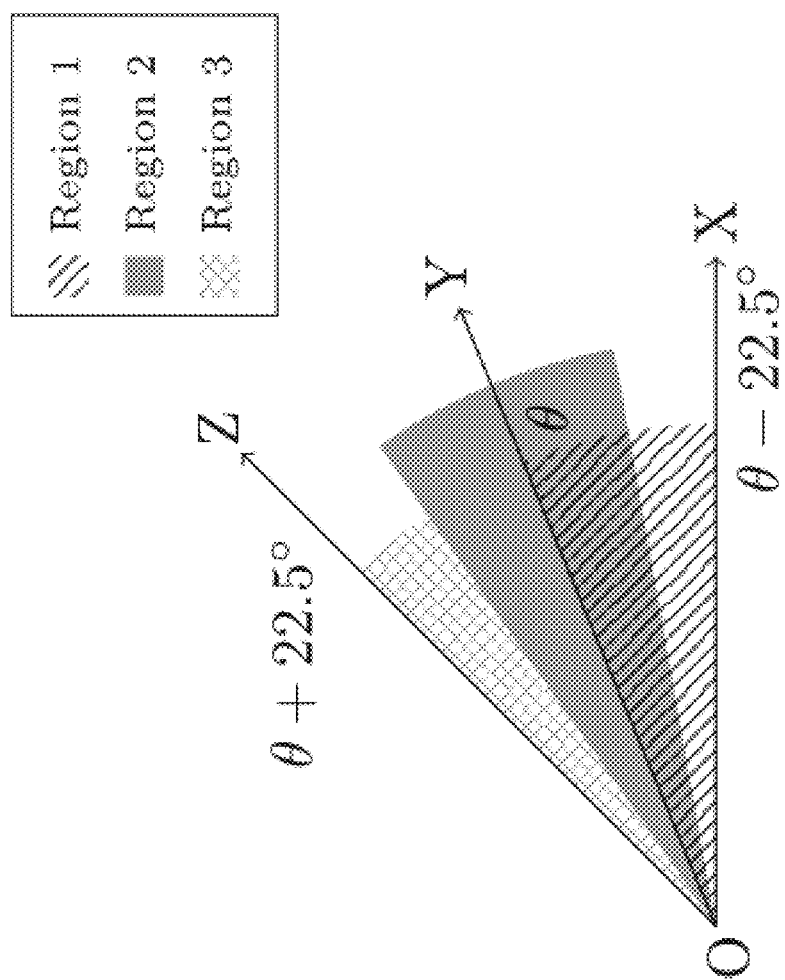
FIG. 21 illustrates an exemplary angle range, according to some embodiments of the present disclosure.

For the angle range estimation, FIG. 21 is used as an illustration. Assume that $\overleftarrow{OY}$ represents the direction $\theta$ formed by the best aligned antenna pair, i.e., the antenna pair with highest score of their TRRS matrix: $\theta = \arg\max_\phi s(\phi)$. The true moving direction should be close to this direction. Three candidate regions are divided: $[\theta-22.5, \theta]$, $[\theta-15°, \theta+15°]$ and $[\theta, \theta+22.5°]$, as shown in the figure. It seems if the score of the direction $\overleftarrow{OX}$, $s(\theta-22.5°)$, is much higher than that of the direction $\overleftarrow{OZ}$, $s(\theta+22.5°)$, the true moving direction should be closer to $\overleftarrow{OX}$ and vice versa. For the case where $s(\theta-22.5°)$ is similar to $s(\theta+22.5°)$, the true direction is likely to lie in the middle. Translating the intuition into implementation, the following ratios are calculated:

$$\beta_1 = \frac{\frac{s(\theta) + s(\theta - 22.5°)}{2} - s(\theta + 22.5°)}{s(\theta) - s(\theta - 22.5°)} \tag{23}$$

$$\beta_2 = \frac{\frac{s(\theta) + s(\theta + 22.5°)}{2} - s(\theta - 22.5°)}{s(\theta) - s(\theta + 22.5°)}$$

Then, they are compared with a positive threshold $\beta$, respectively. If $\beta_1 > \beta$, $s(\theta+22.5°)$ is too small to be chosen, and the estimated range is Region 1. Similarly, if $\beta_2 > \beta$, Region 3 is selected as the angle range. If neither of the conditions holds, the true moving direction most likely resides in Region 2.

After the rough range estimation, a finer direction estimation can be achieved utilizing the geometric relations and time delays of peak traces in the selected TRRS matrices. There are two cases: (1) Only two different (adjacent) directions have clear peak traces (high scores) in the corresponding TRRS matrices, referring to Region 1 and 3 in FIG. 21. (2) Three different (contiguous) directions with clear peak traces in the TRRS matrices can be found, as the Region 2 in FIG. 21.

Figure 22:
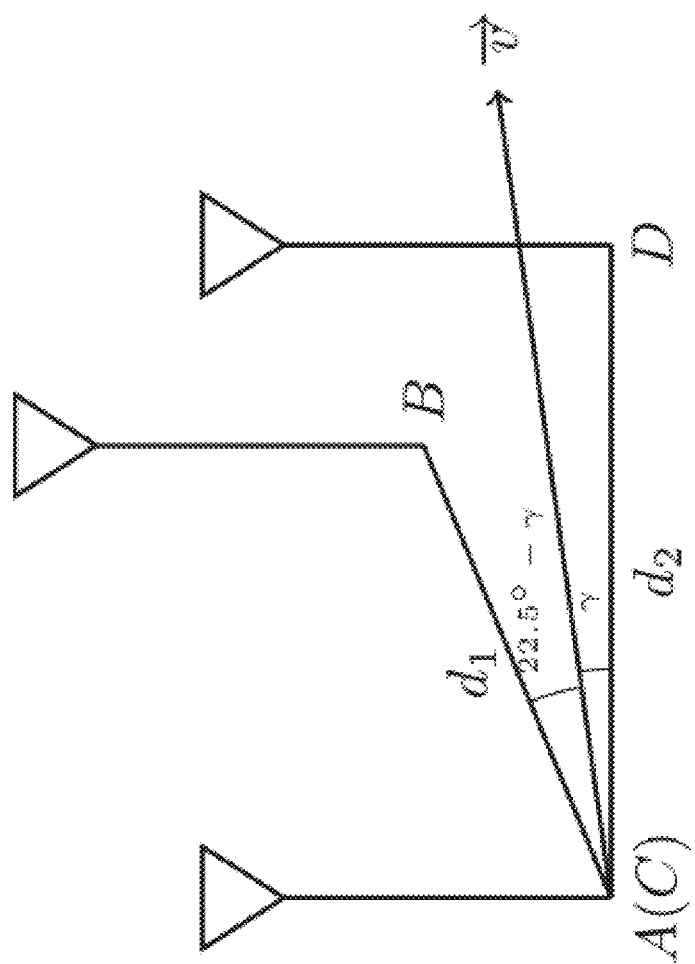
FIG. 22 illustrates an exemplary first case direction estimate, according to some embodiments of the present disclosure.

For the first case, let antenna pairs AB and CD be the best aligned pairs for the two adjacent directions, as shown in FIG. 22. Denote the distance between AB as $d_1$ and the distance between CD as $d_2$. The moving direction is the direction pointed by the arrow, which lies in the 22.5 angle range. The deviation of the moving direction from $\overleftarrow{CD}$ is $\gamma$, thus the angle between the moving direction and $\overleftarrow{AB}$ is $22.5° - \gamma$. Referring to Eqn. (14), the velocities calculated using AB and CD are: $\overleftarrow{AB}$ $$v_1 = \frac{d_1 \cos(22.5° - \gamma)}{\Delta t_1} \tag{24}$$

$$v_2 = \frac{d_2 \cos(\gamma)}{\Delta t_2}$$

where $\Delta t_1$ and $\Delta t_2$ are the time delays of peak traces in the TRRS matrices of AB and CD, respectively. Since the size of the antenna array is very small, at the scale of wavelength (5.17 cm for $f_0 = 5.8$ GHz), the moving speed cannot vary much in such a short distance:

$$v_1 \approx v_2 \tag{25}$$

$$\frac{d_1 \cos(22.5° - \gamma)}{\Delta t_1} \approx \frac{d_2 \cos(\gamma)}{\Delta t_2}$$

$$\gamma \approx \tan^{-1}\left(\frac{\frac{d_2 \Delta t_1}{d_1 \Delta t_2} - \cos 22.5°}{\sin 22.5°}\right)$$

Then, the estimate of $\gamma$ is calculated as:

$$\hat{\gamma} = \tan^{-1}\left(\frac{\frac{d_2 \Delta t_1}{d_1 \Delta t_2} \cos 22.5°}{\sin 22.5°}\right) \tag{26}$$

Figure 23:
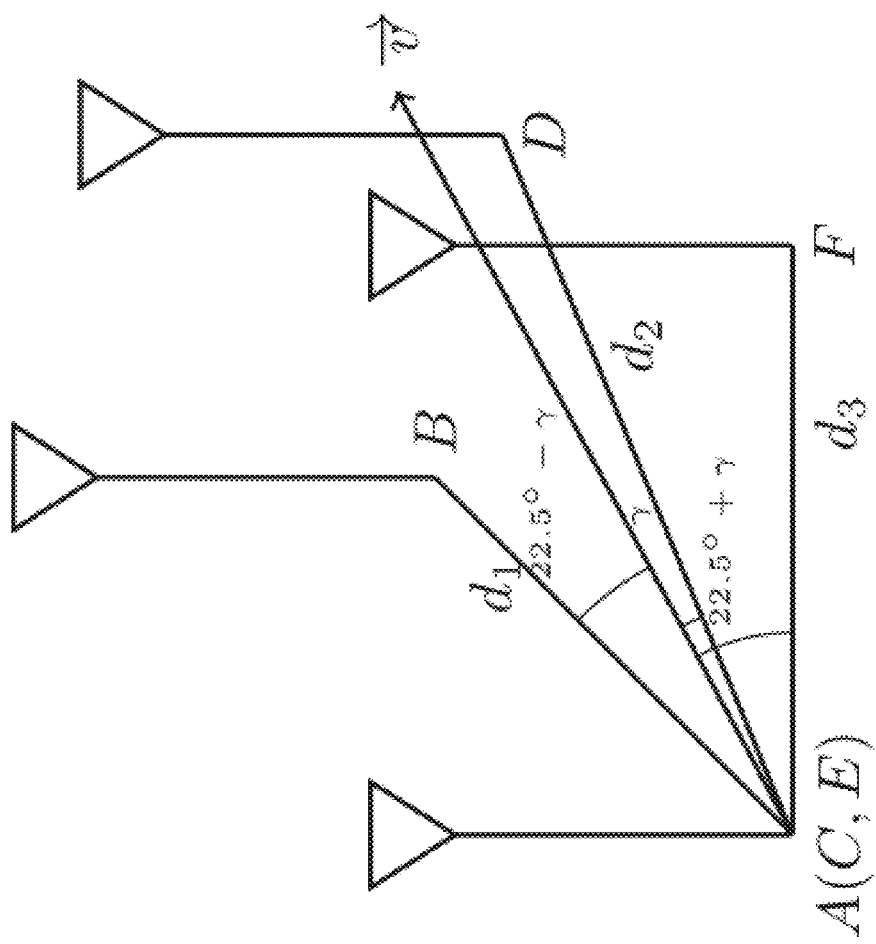
FIG. 23 illustrates an exemplary second case direction estimate, according to some embodiments of the present disclosure.

For the second case, the geometric relations are demonstrated in FIG. 23, with the meaning explained in FIG. 22. Similar to the first case, the velocities can be estimated using each pair of antennas:

$$v_1 = \frac{d_1 \cos(22.5° - \gamma)}{\Delta t_1} \tag{27}$$

$$v_2 = \frac{d_2 \cos(\gamma)}{\Delta t_2}$$

$$v_3 = \frac{d_3 \cos(22.5° + \gamma)}{\Delta t_3}$$

The estimated $\gamma$ is calculated as:

$$\hat{\gamma} = \arg\min_{\gamma}(v_1 - v_2)^2 + (v_3 - v_2)^2 \tag{28}$$

$$\hat{\gamma} = \tan^{-1}\left(\frac{\frac{d_2 \Delta t_3}{d_3 \Delta t_2} - \frac{d_2 \Delta t_1}{d_1 \Delta t_2}}{2 \sin 22.5°}\right)$$

Summarizing the above discussion, the detailed moving direction estimation algorithm is described in Algorithm 1 below.

---

Algorithm 1: Moving Direction Estimation

---

Input:
{G} : set of TRRS matrices for all pairs of antennas;
a(G): direction of the antenna pair with TRRS matrix G;
η: positive scaling factor;
β: positive threshold
Output:
θ: estimated moving direction
Procedure:
  1: for G ∈ {G} do        // Initialization
  2:     φ = a(G)
  3:     s(φ) = −∞
  4:  $s_{max}$ = −∞
  5: for G ∈ {G} do        // calculating scores on each direction
  6:     s(G) = e(G) − ησ(G)
  7:     φ = a(G)
  8:     if s(G) > s(φ) then
  9:         s(φ) = s(G)
 10:         a(φ) = a(G)
 11:     θ = a(arg max$_G$ s(G))
 12: calculate ratios $\beta_1$ and $\beta_2$  // angle range estimation
 13: if $\beta_1$ > β then          // [θ − α, θ]
 14:     calculate $\hat{\gamma}$ according to Eqn. (26)
 15:     return θ − α + $\hat{\gamma}$
 16: else if $\beta_2$ > β then     // [θ, θ + α]
 17:     calculate $\hat{\gamma}$ according to Eqn. (26)
 18:     return θ + $\hat{\gamma}$
 19: else                     // $\left[\theta - \frac{2}{3}\alpha, \theta + \frac{2}{3}\alpha\right]$
 20:     calculate $\hat{\gamma}$ according to Eqn. (28)
 21:     return θ + $\hat{\gamma}$

---

Figure 24:
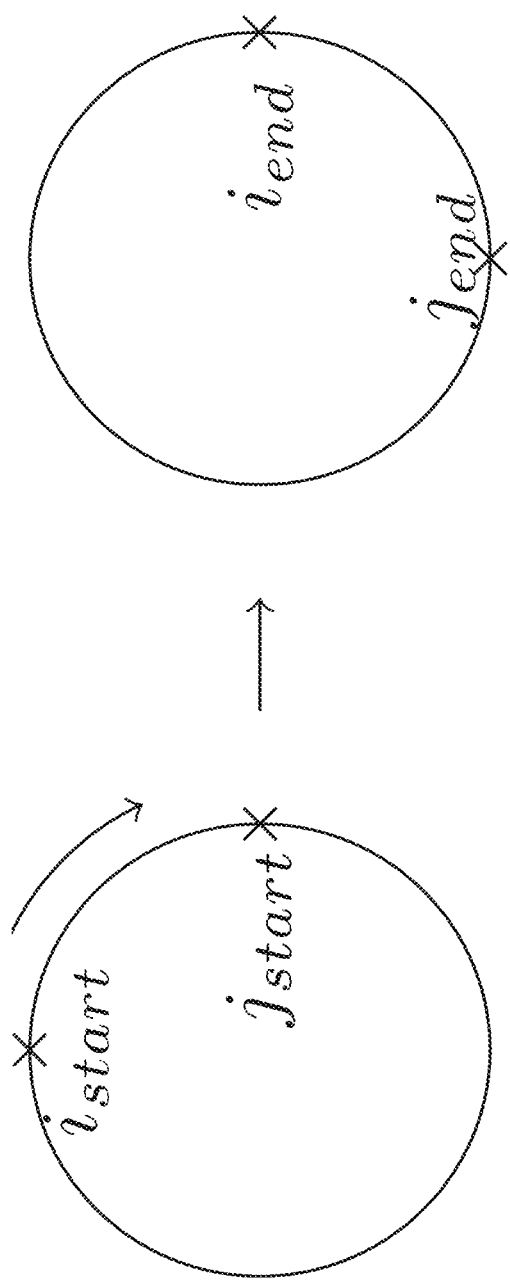
FIG. 24 illustrates an exemplary in-place rotation aligned antenna pairs, where the antenna i rotates to a location closest to the initial position of antenna j, according to some embodiments of the present disclosure.

Similar to the moving direction, the TRRS value may also be used for determining the in-place rotation angle. The rationale behind the algorithm is that if antenna i on the periphery rotates to a position closest to the starting location of antenna j on the periphery, as shown in FIG. 24, it is expected that the TRRS between those two CSI measurements ($i_{end}$, $j_{start}$) yields a high value, which can be used to infer the rotation angle.

More precisely, let $H_j(t_1)$ denote the CSI measurement of antenna j at time $t_1$, and $H_i(t_2)$ be the CSI measured by antenna i at time $t_2$, where both the antenna i and j are on the periphery. To estimate the rotation angle from $t_1$ to $t_2$, one needs to correctly identify the aligned pairs of antennas between $t_1$ and $t_2$. The TRRS values between all pairs of antennas on the periphery are calculated as below:

$$\rho_{ij} = \rho(H_i(t_2), H_j(t_1)). \tag{29}$$

Denote the rotation angle from antenna i to antenna j as $a_{ij}$. Notice that for different pairs of antennas, they may have the same rotation angle. For example, the rotation angle is 2α for all the adjacent antenna pairs. Thus, the TRRS values for antenna pairs with same rotation angle can be averaged to suppress noise as follows:

$$\rho_a = \frac{1}{n} \sum_{a_{ij}=a} \rho(H_j(t_2), H_j(t_1)), \tag{30}$$

where $\rho_a$ denotes the averaged TRRS value for rotation angle a, and n represents the number of antenna pairs with a rotation angle of a. Following Eqn. (30), the rotation angle is estimated as the one with maximum TRRS value:

$$\hat{a} = \arg\max_a \rho_a. \tag{31}$$

Rotation Angle Resolution: Although the accuracy of the in-place rotation angle estimation is comparable to the gyroscope, the resolution is currently discrete, which is determined by the number of antennas in the array. One obvious way to improve the resolution is to increase the number of antennas, but the drawbacks are the complexities on both the hardware and software, and also the increasing size of the array. One may achieve continuous resolution on rotation angle estimation using RF signals.

Antenna Array Size: The current size of the antenna array seems large, especially compared to the mobile phones, but it is already attractive for dedicated industrial applications such as robots and tracking carts. With the maturing of WiFi technology with many antennas on a chip and at higher carrier frequencies, e.g., 60 GHz, the size will be small enough to be embedded in mobile devices.

Direction Finding in 3D: While the disclosed system estimates directions accurately in 2D, it cannot measure the 3D directions. One possible approach is to build a dedicated 3D antenna array to find aligned pairs in 3D, which is useful particularly for drones. Again, with the development of 5G technology, the short wavelength of the millimeter wave will make the design of a 3D antenna array more feasible.

In an example, the disclosed RIM system can be used on a virtual reality (VR) device or an augmented reality (AR) device to track a motion of a user's head based on WiFi-based motion sensing, while the user is wearing the VR or AR device. As such, the scenario the user can see or experience via the VR or AR device will change in accordance with the motion of the user's head. The motion tracking may include estimating a direction of the motion, an angular speed of the motion, and/or an orientation of the head, etc. In other examples, a similar motion tracking may be applied based on the disclosed system to monitor a motion of: a head, arm, leg, or hand of a user playing a mobile game; a robot operating in a factory or a restaurant; a head, arm, leg, or hand of a user in a smart car; and/or a monitoring device attached to a patient.

In various embodiments of the present teaching, wireless inertial measuring may be performed according to the following clauses.

Clause 1: A method/apparatus/software/system of an object tracking system, comprising: obtaining a plurality of time series of channel information (CI) of a wireless multipath channel using a processor, a memory communicatively coupled with the processor and a set of instructions stored in the memory, each time series of CI (TSCI) associated with a pair of transmitting antenna and receiving antenna, wherein the plurality of TSCI are extracted from a wireless signal transmitted between a Type 1 heterogeneous wireless device (wireless transmitter) with at least one transmitting antenna and a Type 2 heterogeneous wireless device (wireless receiver) with at least one receiving antenna through the wireless multipath channel, wherein each TSCI is associated with an antenna of the Type 1 device and an antenna of the Type 2 device, wherein one of the Type 1 device and the Type 2 device is stationary and the other one is moving with an object, wherein the moving device moves comprises: at least two antennas with known configuration and known distances, determining that a first CI at a first time of a first TSCI associated with a first antenna of the moving device matches a second CI at a second time of a second TSCI associated with a second antenna of the moving device, wherein both the first TSCI and the second TSCI are associated with a particular antenna of the stationary device, computing at least one movement parameter of the moving device based on at least one of: the plurality of TSCI, the configuration of antennas of the moving device, the configuration of antennas of the stationary device, time difference between the first time and the second time, and distance between the first antenna and the second antenna; computing a spatial-temporal information (STI) of the moving device based on at least one of: the at least one movement parameter, the first time, the second time, the configuration of antennas of the stationary device, the configuration of antennas of the moving device, a past STI, and a past movement parameter, wherein at least one of the movement parameter and the STI is related to a current movement of the moving device and comprises at least one of: a location, a horizontal location, a vertical location, a length, an area, a volume, a capacity, a direction, an angle, a distance, a displacement, a speed, a velocity, an acceleration, a rotational speed, a rotational acceleration, a gait cycle, a presence, a motion type, a motion classification, a motion characteristics, a sudden motion, a transient motion, a periodic motion, a period of the periodic motion, a frequency of the periodic motion, a transient motion, a time trend, a timing, a timestamp, a time period, a time window, a sliding time window, a history, a frequency trend, a spatial-temporal trend, a spatial-temporal change, and an event; tracking the object and the moving device based on the STI, wherein tracking the object and the moving device comprises at least one of: determining a map location of the object, tracking the location of the object, tracking another motion analytics of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting heartbeat of the object, detecting an event associated with the current movement, detecting a fall-down movement of the object, presenting the location of the object, presenting a history of the location of the object, and displaying the location of the object graphically.

In one embodiment, object moving straight between first time and second time (i.e. no direction change); first CI is a current CI at current time, and second CI is a previous CI at previous time; movement parameter is a distance travelled between first time and second time, and/or angle between antenna axis and moving direction (antenna axis means an axis connecting first antenna and second antenna of moving device).

Clause 2: The method/apparatus/software/system of the object tracking system of clause 1: wherein the Type 1 device is stationary and the Type 2 device is moving.

Clause 3: The method/apparatus/software/system of the object tracking system of clause 2: wherein the wireless signal is received by a second Type 2 heterogeneous wireless device; wherein the second Type 2 device is moving and is configured to: extract at least one second TSCI from the wireless signal, each TSCI being associated with an antenna of the Type 1 device and an antenna of the second Type 2 device, and compute the STI of the second Type 2 device based on the at least one second TSCI.

Clause 4: The method/apparatus/software/system of the object tracking system of clause 2: wherein a sounding rate associated with the plurality of TSCI and the Type 2 device is different from a second sounding rate associated with the at least one second TSCI and the second Type 2 device.

Clause 5: The method/apparatus/software/system of the object tracking system of clause 2: wherein the STI of the Type 2 device is shared to the second Type 2 device.

Clause 6: The method/apparatus/software/system of the object tracking system of clause 2: wherein the STI of the second Type 2 device is shared to the Type 2 device.

Clause 7: The method/apparatus/software/system of the object tracking system of clause 2: wherein the movement of the Type 2 device and the movement of the second Type 2 device are coordinated.

Clause 8: The method/apparatus/software/system of the object tracking system of clause 1: wherein the Type 2 device is stationary and the Type 1 device is moving.

Clause 9: The method/apparatus/software/system of the object tracking system of clause 8: wherein a second wireless signal is transmitted by a second Type 1 heterogeneous wireless device; wherein the second Type 1 device is moving and is configured to send the second wireless signal asynchronously with respect to the first wireless signal; wherein the Type 2 device is configured to: extract at least one second TSCI from the second wireless signal, each TSCI being associated with an antenna of the second Type 1 device and an antenna of the Type 2 device, and compute a second STI of the second Type 1 device based on the at least one second TSCI.

Clause 10: The method/apparatus/software/system of the object tracking system of clause 9: wherein a sounding rate associated with the wireless signal is different from a second sound rate associated with the second wireless signal.

Clause 11: The method/apparatus/software/system of the object tracking system of clause 9: wherein a sounding rate associated with the wireless signal is similar to the second sound rate associated with the second wireless signal.

Clause 12: The method/apparatus/software/system of the object tracking system of clause 9: wherein the Type 1 device and the second Type 1 device are coordinated in the transmission of the wireless signal and the second wireless signal.

Clause 13: The method/apparatus/software/system of the object tracking system of clause 9: wherein the STI of the Type 1 device is shared to the second Type 1 device.

Clause 14: The method/apparatus/software/system of the object tracking system of clause 9: wherein the STI of the second Type 1 device is shared to the Type 1 device.

Clause 15: The method/apparatus/software/system of the object tracking system of clause 9: wherein the movement of the Type 1 device and the movement of the second Type 1 device are coordinated.

Clause 16: The method/apparatus/software/system of the object tracking system of clause 1: wherein some of the at least two antennas of the moving device are configured in at least one of: a 1-dimensional (1-D) configuration, a straight line, a straight line with uneven spacing, more than one straight lines, a curve, more than one curves, a 2-dimensional (2-D) configuration, a circle, a triangle, a rectangle, a pentagon, a hexagon, a heptagon, an octagon, a polygon, a lattice, an array, a 2-D shape, concentric 2-D shapes with varying size, layers of 2-D shapes, a 3-dimensional (3-D) configuration, a sphere, a cube, a rectangular cube, a constellation, concentric 3-D shapes with varying size, layers of 3-D shapes, an adjustable configuration, and a time varying configuration.

Clause 17: The method/apparatus/software/system of the object tracking system of clause 16: wherein an antenna is positioned at the center of at least one of: a 1-D configuration, a 2-D configuration, and a 3-D configuration.

Clause 18: The method/apparatus/software/system of the object tracking system of clause 1: wherein some antennas of the moving device are configured to have a spacing based on a frequency of the wireless signal.

Clause 19: The method/apparatus/software/system of the object tracking system of clause 1: wherein some antennas of the moving device are configured to have a spacing based on a target movement parameter.

Clause 20: The method/apparatus/software/system of the object tracking system of clause 1: wherein the first CI at the first time is determined to be matched to the second CI at the second time if at least one of: a similarity score between the first CI and the second CI is larger than a threshold, the second time is within a time window associated with the first time and the configuration of the antennas of the moving device, and the similarity score is not smaller than similarity score between the first CI and any CI in any of the TSCI within the time window.

Clause 21: The method/apparatus/software/system of the object tracking system of clause 1, further comprises: determining the first CI at the first time to be matched to the second CI at the second time comprises by: computing a plurality of similarity scores between the first CI and each of a plurality CI of the second TSCI in a time period associated with the first time, determining a maximum similarity score based on the plurality of similarity scores, determining that the maximum similarity score is greater than a threshold, identifying the second CI to be the CI of the second TSCI associated with the maximum, and identifying the second time to be the time associated with the second CI.

Clause 22: The method/apparatus/software/system of the object tracking system of clause 21: wherein the maximum similarity score is determined based on a filtering of the plurality of similarity scores.

Clause 23: The method/apparatus/software/system of the object tracking system of clause 21: wherein the maximum similarity score is determined based on a filtering of the plurality of similarity scores and a history of past similarity scores.

Clause 24: The method/apparatus/software/system of the object tracking system of clause 21: wherein the maximum similarity score is determined by applying dynamic programming to the plurality of similarity scores and a history of past similarity scores.

Clause 25: The method/apparatus/software/system of the object tracking system of clause 21: wherein the movement parameter comprises an angle; wherein the angle is based on an angular bearing between the first antenna and the second antenna.

Clause 26: The method/apparatus/software/system of the object tracking system of clause 21: wherein the movement parameter comprises an angle; wherein the angle is based on at least one of: an angular bearing of the first antenna with respect to the second antenna, and an angular bearing of the second antenna with respect to the first antenna.

Clause 27: The method/apparatus/software/system of the object tracking system of clause 21: wherein the movement parameter comprises an angle; wherein the angle is based on at least one of: an angular bearing between two antennas in the configuration of the antennas of the moving device.

Clause 28: The method/apparatus/software/system of the object tracking system of clause 21: wherein the movement parameter comprises an angle; wherein the angle is based on the configuration of the antennas of the moving device.

Clause 29: The method/apparatus/software/system of the object tracking system of clause 21: wherein the movement parameter comprises an angle; wherein the angle is computed based on the maximum similarity score.

Clause 30: The method/apparatus/software/system of the object tracking system of clause 21: wherein the movement parameter comprises a distance; wherein the distance is computed based on the maximum similarity score.

Clause 31: The method/apparatus/software/system of the object tracking system of clause 21: wherein the movement parameter comprises an angle and a distance, wherein the angle is computed based on at least one of: the maximum similarity score, the distance, the configuration of the antennas of the moving device, the time difference between the first time and the second time, and the distance between the first antenna and the second antenna; wherein the distance is computed based on at least one of: the maximum similarity score, the angle, the configuration of the antennas of the moving device, the time difference between the first time and the second time, and the distance between the first antenna and the second antenna.

Clause 32: The method/apparatus/software/system of the object tracking system of clause 1, further comprising: determining the first CI at a first time of a first TSCI to be matched to the second CI at the second time of the second TSCI by: for each of the plurality of TSCI other than the first TSCI as candidate second TSCI, computing a plurality of similarity scores between the first CI and each of a plurality CI of the respective candidate second TSCI in a respective time period associated with the first time, wherein the time period is associated with the candidate second TSCI, and determining a respective maximum similarity score based on the plurality of similarity scores, determining an overall maximum similarity score among the maximum similarity scores associated with the plurality of TSCI other than the first TSCI, determining that the overall maximum similarity score is greater than a threshold, identifying the second TSCI to be the candidate second TSCI associated with the overall maximum similarity score, identifying the second CI to be the CI of the second TSCI associated with the maximum, and identifying the second time to be the time associated with the second CI.

Clause 33: The method/apparatus/software/system of the object tracking system of clause 32: wherein the respective maximum similarity score is determined based on a filtering of the plurality of similarity scores.

Clause 34: The method/apparatus/software/system of the object tracking system of clause 32: wherein the respective maximum similarity score is determined based on a filtering of the plurality of similarity scores and a history of past similarity scores.

Clause 35: The method/apparatus/software/system of the object tracking system of clause 32: wherein the respective maximum similarity score is determined by applying dynamic programming to the plurality of similarity scores and a history of past similarity scores.

Clause 36: The method/apparatus/software/system of the object tracking system of clause 32, further comprising: determining a number of the plurality of TSCI other than the first TSCI as unlikely candidate second TSCI, and skipping the unlikely candidate second TSCI as candidate second TSCI such that similarity scores with respect to the first CI are not computed for any CI of the unlikely candidate second TSCI.

Clause 37: The method/apparatus/software/system of the object tracking system of clause 1, further comprising: determining the first CI at a first time of a first TSCI to be matched to the second CI at the second time of the second TSCI by: for each of the plurality of TSCI as a candidate first TSCI: for each of the plurality of TSCI other than the candidate first TSCI as a candidate second TSCI: computing a plurality of similarity scores between the CI of the candidate first TSCI at the first time and each of a plurality CI of the candidate second TSCI in a respective time period associated with the first time and the candidate second TSCI, and determining a respective maximum similarity score based on the plurality of similarity scores, and determine a candidate overall maximum similarity score associated with the candidate first TSCI based on the maximum similarity scores; determining an overall maximum similarity score among all the candidate overall maximum similarity scores; determining that the overall maximum similarity score is greater than a threshold; identifying the first TSCI to be the candidate first TSCI associated with the overall maximum similar score; identifying the second TSCI to be the other TSCI associated with the overall maximum similarity score; identifying the second CI to be the CI of the second TSCI associated with the maximum; and identifying the second time to be the time associated with the second CI.

Clause 38: The method/apparatus/software/system of the object tracking system of clause 37: wherein the respective maximum similarity score is determined based on a filtering of the plurality of similarity scores.

Clause 39: The method/apparatus/software/system of the object tracking system of clause 37: wherein the respective maximum similarity score is determined based on a filtering of the plurality of similarity scores and a history of past similarity scores.

Clause 40: The method/apparatus/software/system of the object tracking system of clause 37: wherein the respective maximum similarity score is determined by applying dynamic programming to the plurality of similarity scores and a history of past similarity scores.

Clause 41: The method/apparatus/software/system of the object tracking system of clause 37, further comprising: for each of the plurality of TSCI as a candidate first TSCI: determining a number of the plurality of TSCI other than the candidate first TSCI as unlikely candidate second TSCI, and skipping the unlikely candidate second TSCI as candidate second TSCI such that similarity scores with respect to the CI of the candidate first TSCI at the first time are not computed for any CI of the unlikely candidate second TSCI.

Clause 42: The method/apparatus/software/system of the object tracking system of clause 1, further comprising: determining that a third CI at a third time of a third TSCI associated with a third antenna of the moving device matches a fourth CI at a fourth time of a fourth TSCI associated with a fourth antenna of the moving device, wherein both the third TSCI and the fourth TSCI are associated with another particular antenna of the stationary device; computing the at least one movement parameter of the moving device based on at least one of: the plurality of TSCI, the configuration of antennas of the moving device, the configuration of antennas of the stationary device, time difference between the first time and the second time, time difference between the third time and the fourth time, distance between the first antenna and the second antenna, and distance between the third antenna and the fourth antenna; and computing a spatial-temporal information (STI) of the moving device based on at least one of: the at least one movement parameter, the first time, the second time, the third time, the fourth time, the configuration of antennas of the stationary device, the configuration of antennas of the moving device, a past STI, and a past movement parameter.

Clause 43: The method/apparatus/software/system of the object tracking system of clause 42: wherein the third time is equal to the first time.

Clause 44: The method/apparatus/software/system of the object tracking system of clause 42, further comprising: computing a candidate STI based on a movement parameter computed based on the matching of the first CI and the second CI; computing another candidate STI based on another movement parameter computed based on the matching of the third CI and the fourth CI; computing the STI by aggregating the candidate STI.

Clause 45: The method/apparatus/software/system of the object tracking system of clause 1, further comprising: determining that a third CI at a third time of a third TSCI associated with a third antenna of the moving device matches a fourth CI at a fourth time of a fourth TSCI associated with a fourth antenna of the moving device, wherein both the third TSCI and the fourth TSCI are associated with another particular antenna of the stationary device; computing a probability model for a movement parameter based on at least one of: the matching between the first CI and the second CI, the matching between the third CI and the fourth CI, and another matching between another two CI, computing the at least one movement parameter of the moving device stochastically based on at least one of: the probability model, the plurality of TSCI, the configuration of antennas of the moving device, the configuration of antennas of the stationary device, time difference between the first time and the second time, time difference between the third time and the fourth time, distance between the first antenna and the second antenna, and distance between the third antenna and the fourth antenna; and computing a spatial-temporal information (STI) of the moving device based on at least one of: the at least one movement parameter, the first time, the second time, the third time, the fourth time, the configuration of antennas of the stationary device, the configuration of antennas of the moving device, a past STI, and a past movement parameter.

Clause 46: The method/apparatus/software/system of the object tracking system of clause 1, further comprising: computing a probability model for the at least one movement parameter; computing the at least one movement parameter of the moving device stochastically based on the probability model; and computing the STI of the moving device stochastically based on the at least one stochastically computed movement parameter.

Clause 47: The method/apparatus/software/system of the object tracking system of clause 1, further comprising: computing a probability model for the at least one movement parameter; computing the at least one movement parameter of the moving device stochastically based on the probability model; compute a number of candidate STI of the moving device stochastically, each candidate STI computed based on a stochastically computed movement parameter; computing the STI as an aggregate of the candidate STI.

Clause 48: The method/apparatus/software/system of the object tracking system of clause 1: wherein the movement parameter comprises a distance and the STI comprises a location; wherein the location is computed based on a past location and the distance.

Clause 49: The method/apparatus/software/system of the object tracking system of clause 1: wherein the STI is computed based on an input from a sensor associated with the moving device.

Clause 50: The method/apparatus/software/system of the object tracking system of clause 1: wherein the movement parameter comprises a distance and an angle; wherein the STI comprises a location; wherein the location is computed based on a past location, the distance and the angle.

Clause 51: The method/apparatus/software/system of the object tracking system of clause 1: wherein the movement parameter comprises a distance; wherein the STI comprises a speed; wherein the speed is computed based on the distance and the time difference between the first time and the second time.

Clause 52: The method/apparatus/software/system of the object tracking system of clause 51: wherein the movement parameter comprises a distance; wherein a speed is computed based on the distance and the time difference between the first time and the second time; wherein the STI comprises an acceleration; wherein the acceleration is computed based on the speed, the time difference, and a past speed computed based on a past distance and a past time difference.

Clause 53: The method/apparatus/software/system of the object tracking system of clause 1: wherein the movement parameter comprises an angle; wherein the STI comprises a direction; wherein the direction is computed based on a past direction and the angle.

Clause 54: The method/apparatus/software/system of the object tracking system of clause 1: wherein a trajectory is computed based on the STI and a history of the STI.

55: The method/apparatus/software/system of the object tracking system of clause 1: wherein tracking the object and the moving device comprises displaying a trajectory of the moving device.

Clause 56: The method/apparatus/software/system of the object tracking system of clause 1, further comprising: determining that a straight line connecting the first antenna and the second antenna of the moving device is parallel to a straight line connecting a third antenna and a fourth antenna of the moving device; determining that a third CI at a third time of a third TSCI associated with the third antenna matches a fourth CI at a fourth time of a fourth TSCI associated with the fourth antenna, wherein both the third TSCI and the fourth TSCI are associated with another particular antenna of the stationary device; computing at least one movement parameter of the moving device based on at least one of: the plurality of TSCI, the configuration of antennas of the moving device, the configuration of antennas of the stationary device, time difference between the first time and the second time, time difference between the third time and the fourth time, distance between the first antenna and the second antenna, and distance between the third antenna and the fourth antenna; and computing a spatial-temporal information (STI) of the moving device based on at least one of: the at least one movement parameter, the first time, the second time, the third time, the fourth time, the configuration of antennas of the stationary device, the configuration of antennas of the moving device, a past STI, and a past movement parameter.

Clause 57: The method/apparatus/software/system of the object tracking system of clause 56, further comprising: computing a candidate STI based on a movement parameter computed based on the matching of the first CI and the second CI; computing another candidate STI based on another movement parameter computed based on the matching of the third CI and the fourth CI; computing the STI by aggregating the candidate STI.

Clause 58: The method/apparatus/software/system of the object tracking system of clause 1, further comprising: determining that a straight line connecting the first antenna and the second antenna of the moving device is parallel to a straight line connecting a third antenna and a fourth antenna of the moving device; determining jointly that the first CI at the first time matches the second CI at the second time, and a third CI at the first time of a third TSCI associated with the third antenna matches a fourth CI at a fourth time of a fourth TSCI associated with the fourth antenna, wherein both the third TSCI and the fourth TSCI are associated with another particular antenna of the stationary device; computing the at least one movement parameter of the moving device based on at least one of: the plurality of TSCI, the configuration of antennas of the moving device, the configuration of antennas of the stationary device, time difference between the first time and the second time, time difference between the first time and the fourth time, distance between the first antenna and the second antenna, and distance between the third antenna and the fourth antenna; and computing a spatial-temporal information (STI) of the moving device based on at least one of: the at least one movement parameter, the first time, the second time, the fourth time, the configuration of antennas of the stationary device, the configuration of antennas of the moving device, a past STI, and a past movement parameter.

Clause 59: The method/apparatus/software/system of the object tracking system of clause 58, further comprising: computing a candidate STI based on a movement parameter computed based on the matching of the first CI and the second CI; computing another candidate STI based on another movement parameter computed based on the matching of the third CI and the fourth CI; computing the STI by aggregating the candidate STI.

Clause 60: The method/apparatus/software/system of the object tracking system of clause 1, further comprising: preprocessing the TSCI.

Clause 61: The method/apparatus/software/system of the object tracking system of clause 1, further comprising: transmitting at least one of: a movement parameter, and the STI to the Type 1 device.

Clause 62: The method/apparatus/software/system of the object tracking system of clause 1, further comprising: transmitting at least one of: a movement parameter, and the STI to a server.

Clause 63: The method/apparatus/software/system of the object tracking system of clause 1, further comprising: obtaining at least one of: the past STI and the past movement parameter, from a sensor communicatively coupled with the processor and memory, wherein the sensor comprises at least one of: BLE, RFID, GPS, a passive infra-red (PIR) sensor, a light sensor, a radar-based sensor, a radio-based sensor, a WiFi-based sensor, an LTE-based sensor, a 5G sensor, a beyond-5G sensor, an optical-based sensor, and another locationing sensor.

Clause 64: The method/apparatus/software/system of the object tracking system of clause 1, further comprising: sending digital data with the wireless signal.

Clause 65: The method/apparatus/software/system of the object tracking system of clause 1, further comprising: communicating wireless network traffic in the wireless multipath channel and transmitting the wireless signal between the Type 1 device and the Type 2 device in parallel.

Clause 66: The method/apparatus/software/system of the object tracking system of clause 1, further comprising: switching the wireless multipath channel when a signal quality metric is below a threshold.

Clause 67: The method/apparatus/software/system of the object tracking system of clause 1, further comprising: sending meta data with the wireless signal.

Clause 68: The method/apparatus/software/system of the object tracking system of clause 1, further comprising: obtaining the plurality of TSCI from a wireless integrated circuit (IC).

Clause 69: The method/apparatus/software/system of the object tracking system of clause 1, further comprising: obtaining the plurality of TSCI from a wireless integrated circuit (IC); accessing the internet using another wireless IC.

Clause 70: The method/apparatus/software/system of the object tracking system of clause 1, further comprising: obtaining the plurality of TSCI from a radio of a wireless integrated circuit (IC); accessing the internet using another radio of the wireless IC.

Clause 71: The method/apparatus/software/system of the object tracking system of clause 1, wherein: the channel information comprises at least one of: channel state information (CSI), received signal power, compressed CSI, uncompressed CSI, radio state, modem parameters, channel impulse response (CIR), channel frequency response (CFR), the effect of the environment on the wireless signal, magnetic response, and phase response.

Clause 72: The method/apparatus/software/system of the object tracking system of clause 1, further comprising: skipping a CI of a TSCI when a signal quality metric is below a threshold.

Clause 73: The method/apparatus/software/system of the object tracking system of clause 1: wherein the wireless signal is transmitted according to at least one common wireless standard; wherein the at least one common wireless standard to comprise at least one of: WiFi, LTE, LTE-A, LTE-U, 2.5G, 3G, 3.5G, 4G, beyond 4G, 5G, 6G, 7G, 8G, a 802.11 standard, a 802.15 standard, a 802.16 standard, 802.11a/b/n/ac/ax/ay/az, mesh network, Zigbee, WiMax, BlueTooth, BLE, RFID, UWB, a microwave system, and a radar like system.

Clause 74: The method/apparatus/software/system of the object tracking system of clause 1: wherein the wireless signal is transmitted according to a WiFi standard; wherein the wireless signal is transmitted in a WiFi channel with a bandwidth allowable by the WiFi standard.

Clause 75: The method/apparatus/software/system of the object tracking system of clause 1, further comprising: wherein the Type 1 device is stationary and the Type 2 device is moving; wherein there are multiple Type 1 devices in a venue; determining that signal quality associated with the Type 1 device is below a threshold, determining that signal quality associated with the another Type 1 device is above another threshold, configuring the Type 2 device to: switch from the Type 1 device with a low signal quality to another Type 1 device with a high signal quality, stop to receive the wireless signal from the Type 1 device, start to receive another wireless signal from the another Type 1 device, and obtain the rest of the plurality of TSCI by extracting CI from the another wireless signal instead of the wireless signal.

Clause 76: The method/apparatus/software/system of the object tracking system of clause 1, further comprising: wherein the Type 1 device is moving and the Type 2 device is stationary; wherein there are multiple Type 2 devices in a venue; determining that signal quality associated with the Type 2 device is below a threshold; determining that signal quality associated with the another Type 2 device is above another threshold; configuring the Type 2 device to stop: receiving the wireless signal from the Type 1 device, extracting the plurality of TSCI from the wireless signal, determining the matching of CI of first TSCI and CI of second TSCI, computing the at least one movement parameter of the moving device, and computing the STI of the moving device; configuring the another Type 2 device to start: receiving the wireless signal from the Type 1 device, extracting the rest of the plurality of TSCI from the wireless signal, determining the matching of CI of first TSCI and CI of second TSCI, computing the at least one movement parameter of the moving device, and computing the STI of the moving device.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. An object tracking system, comprising:
a transmitter configured for transmitting a wireless signal through a wireless multipath channel;
a receiver configured for:
receiving the wireless signal through the wireless multipath channel, and
extracting a plurality of time series of channel information (TSCI) of the wireless multipath channel from the wireless signal, wherein:
each of the plurality of TSCI is associated with an antenna of the transmitter and an antenna of the receiver,
one of the transmitter and the receiver is a stationary device,
the other one of the transmitter and the receiver is a moving device moving with an object; and
a processor configured for:
determining that a first channel information (CI) at a first time of a first TSCI associated with a first antenna of the moving device matches a second CI at a second time of a second TSCI associated with a second antenna of the moving device, wherein both the first TSCI and the second TSCI are associated with a particular antenna of the stationary device;
computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna;
computing a spatial-temporal information (STI) of the moving device based on at least one of: the at least one movement parameter, the first time, the second time, the configuration of antennas of the moving device, the configuration of at least one antenna of the stationary device, a past SIT, and a past movement parameter, wherein at least one of the movement parameter and the STI is related to a current movement of the moving device; and
tracking the object and the moving device based on the STI,
wherein:
some of the antennas of the moving device are configured to have a spacing based on a frequency of the wireless signal or a target movement parameter; and
the first CI at the first time is determined to be matched to the second CI at the second time based on at least one of:
a similarity score between the first CI and the second CI is larger than a threshold,
the second time is within a time window associated with the first time and the configuration of the antennas of the moving device, or
the similarity score is not smaller than another similarity score between the first CI and any CI in any of the TSCI within the time window.

2. The object tracking system of claim 1; wherein:
at least one of the movement parameter and the STI comprises at least one of: a location, a horizontal location, a vertical location, a length, an area, a volume, a capacity, a direction, an angle; a distance, a displacement, a speed; a velocity, an acceleration, a rotational speed, a rotational acceleration, a gait cycle, a presence, a motion type, a motion classification, a motion characteristics, a sudden motion, a transient motion, a periodic motion, a period of the periodic motion, a frequency of the periodic motion; a transient motion, a time trend, a timing, a timestamp, a time period, a time window, a sliding time window, a history, a frequency trend, a spatial-temporal trend, a spatial-temporal change, and an event; and
tracking the object and the moving device comprises at least one of: determining a map location of the object, tracking the location of the object, tracking another motion analytics of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting heartbeat of the object, detecting an event associated with the current movement; detecting a fall-down movement of the object, presenting the location of the object, presenting a history of the location of the object, and displaying the location of the object graphically.

3. The object tracking system of claim 1, wherein:
the transmitter is the stationary device and the receiver is the moving device;
the wireless signal is received by a second receiver that is moving and configured to:
extract, from the wireless signal, another plurality of TSCI each of which is associated with an antenna of the transmitter and an antenna of the second receiver, and
compute a STI of the second receiver based on the another plurality of TSCI;
a sounding rate associated with the plurality of TSCI and the receiver is different from a second sounding rate associated with the another plurality of TSCI and the second receiver;
the STI of the receiver is shared to the second receiver;

the STI of the second receiver is shared to the receiver; and movements of the receiver and the second receiver are coordinated.

4. The object tracking system of claim 1, wherein:

the receiver is the stationary device and the transmitter is the moving device;

a second transmitter is moving and configured to transmit a second wireless signal asynchronously with respect to the wireless signal;

a sounding rate associated with the wireless signal is different from a second sounding rate associated with the second wireless signal;

the receiver is configured to:
  extract, from the second wireless signal, another plurality of TSCI each of which is associated with an antenna of the second transmitter and an antenna of the receiver, and
  compute a second STI of the second transmitter based on the another plurality of TSCI;

the transmitter and the second transmitter are coordinated for transmitting the wireless signal and the second wireless signal;

the STI of the transmitter is shared to the second transmitter;

the STI of the second transmitter is shared to the transmitter; and movements of the transmitter and the second transmitter are coordinated.

5. The object tracking system of claim 1, wherein:

some of the antennas of the moving device are configured in at least one of: a 1-dimensional (1-D) configuration, the 1-D configuration with a center, a straight line, a straight line with uneven spacing, multiple straight lines, a curve, multiple curves, a 2-dimensional (2-D) configuration, the 2-D configuration with a center, a circle, a triangle, a rectangle, a pentagon, a hexagon, a heptagon, an octagon, a polygon, a lattice, an array, a 2-D shape, concentric 2-D shapes with varying size, layers of 2-D shapes, a 3-dimensional (3-D) configuration, the 3-D configuration with a center, a sphere, a cube, a rectangular cube, a constellation, concentric 3-D shapes with varying size, layers of 3-D shapes, an adjustable configuration, and a time varying configuration.

6. The object tracking system of claim 1, wherein determining that the first CI at the first time matches the second CI at the second time comprises:

computing a plurality of similarity scores between the first CI and each CI of the second TSCI in a time period associated with the first time;

determining a maximum similarity score among the plurality of similarity scores;

determining that the maximum similarity score is greater than a threshold;

determining that the maximum similarity score is computed between the first CI and the second CI; and identifying the second time to be associated with the second CI.

7. The object tracking system of claim 6, wherein:

the maximum similarity score is determined based on at least one of: a filtering of the plurality of similarity scores, a history of past similarity scores, and an application of a dynamic programming to at least one of: the plurality of similarity scores and the history of past similarity scores;

the at least one movement parameter comprises at least one of:
  an angle computed based on at least one:
    an angular bearing between the first antenna and the second antenna,
    an angular bearing of the first antenna with respect to the second antenna,
    an angular bearing of the second antenna with respect to the first antenna,
    an angular bearing between two antennas in the configuration of the antennas of the moving device,
    the configuration of the antennas of the moving device, and
    the maximum similarity score;
  and a distance computed based on the maximum similarity score.

8. The object tracking system of claim 6, wherein:

the at least one movement parameter comprises at least one of: an angle and a distance;

the angle is computed based on at least one of: the maximum similarity score, the distance, the configuration of the antennas of the moving device, the time difference between the first time and the second time, and the distance between the first antenna and the second antenna; and the distance is computed based on at least one of: the maximum similarity score, the angle, the configuration of the antennas of the moving device, the time difference between the first time and the second time, and the distance between the first antenna and the second antenna.

9. The object tracking system of claim 1, wherein determining that the first CI at the first time matches the second CI at the second time comprises:

for each of the plurality of TSCI, other than the first TSCI, as a candidate second TSCI,
  computing a plurality of similarity scores between the first CI and each CI of the candidate second TSCI in a respective time period associated with the first time and associated with the candidate second TSCI, and
  determining a respective maximum similarity score among the plurality of similarity scores;

determining an overall maximum similarity score among the maximum similarity scores associated with the plurality of TSCI other than the first TSCI;

determining that the overall maximum similarity score is greater than a threshold;

identifying the second TSCI: to be a candidate second TSCI associated with the overall maximum similarity score;

identifying the second CI to be a CI of the second TSCI associated with the overall maximum similarity score; and identifying the second time to be associated with the second CI.

10. The object tracking system of claim 9, wherein:

the respective maximum similarity score is determined based on at least one of: a filtering of the plurality of similarity scores, a history of past similarity scores, and an application of a dynamic programming to at least one of: the plurality of similarity scores, and the history of past similarity scores.

11. The object tracking system of claim 9, wherein determining that the first CI at the first time matches the second CI at the second time further comprises:

determining at least one of the plurality of TSCI other than the first TSCI as unlikely candidate second TSCI; and skipping the unlikely candidate second TSCI such that similarity scores with respect to the first CI are not computed for any CI of the unlikely candidate second TSCI.

12. The object tracking system of claim 1, wherein determining that the first CI at the first time matches the second CI at the second time comprises:

for each of the plurality of TSCI as a candidate first TSCI,
for each of the plurality of TSCI, other than the candidate first TSCI, as a candidate second TSCI,
computing a plurality of similarity scores between each CI of the candidate first TSCI at the first time and each CI of the candidate second TSCI in a respective time period associated with the first time and the candidate second TSCI, and
determining a respective maximum similarity score based on the plurality of similarity scores, and
determine a candidate overall maximum similarity score associated with the candidate first TSCI based on the maximum similarity scores;
determining an overall maximum similarity score among all the candidate overall maximum similarity scores;
determining that the overall maximum similarity score is greater than a threshold;
identifying the first TSCI to be a candidate first TSCI associated with the overall maximum similarity score;
identifying the second TSCI to be a candidate second TSCI associated with the overall maximum similarity score;
identifying the first CI to be a CI of the first TSCI associated with the overall maximum similarity score;
identifying the second CI to be a CI of the second TSCI associated with the overall maximum similarity score; and
identifying the second time to be associated with the second CI.

13. The object tracking system of claim 12, wherein:
the respective maximum similarity score is determined based on at least one of: a filtering of the plurality of similarity scores, a history of past similarity scores, and an application of a dynamic programming to at least one of: the plurality of similarity scores, and the history of past similarity scores.

14. The object tracking system of claim 12, wherein determining that the first CI at the first time matches the second CI at the second time further comprises:

for each of the plurality of TSCI as the candidate first TSCI,
determining at least one of the plurality of TSCI other than the candidate first TSCI as unlikely candidate second TSCI; and
skipping the unlikely candidate second TSCI such that similarity scores with respect to each CI of the candidate first TSCI at the first time are not computed for any CI of the unlikely candidate second TSCI.

15. The object tracking system of claim 1; wherein the processor is further configured for:
determining that a third CI at a third time of a third TSCI associated with a third antenna of the moving device matches a fourth CI at a fourth time of a fourth TSCI associated with a fourth antenna of the moving device, wherein both the third TSCI and the fourth TSCI are associated with another particular antenna of the stationary device;
computing the at least one movement parameter of the moving device based on at least one of:
the plurality of TSCI,
the configuration of antennas of the moving device,
the configuration of antennas of the stationary device,
the time difference between the first time and the second time,
a time difference between the third time and the fourth time,
the distance between the first antenna and the second antenna, and
a distance between the third antenna and the fourth antenna; and
computing the STI of the moving device based on at least one of:
the at least one movement parameter,
the first time, the second time, the third time, the fourth time,
the configuration of antennas of the stationary device,
the configuration of antennas of the moving device,
the past STI, and
the past movement parameter.

16. The object tracking system of claim 15, wherein:
the third time is equal to the first time; and
computing the STI of the moving device comprises:
computing a first candidate STI based on a first movement parameter computed based on the matching of the first CI and the second CI,
computing a second candidate STI based on a second movement parameter computed based on the matching of the third CI and the fourth CI, and
computing the STI by aggregating the first candidate STI and the second candidate STI.

17. The object tracking system of claim 1, wherein:
the at least one movement parameter comprises at least one of: a distance and an angle;
the STI comprises a location computed based on at least one of: a past location, the distance, and the angle; and
the STI is computed based on an input from a sensor associated with the moving device.

18. The object tracking system of claim 1, wherein:
the at least one movement parameter comprises at least one of: a distance and an angle;
the STI comprises a speed computed based on the distance and the time difference between the first time and the second time;
the STI comprises an acceleration computed based on the speed, the time difference, and a past speed computed based on a past distance and a past time difference; and
the STI comprises a direction computed based on a past direction and the angle.

19. The object tracking system of claim 1, wherein tracking the object and the moving device comprises:
computing a trajectory of the object and the moving device based on the STI and a history of the STI; and
displaying the trajectory.

20. The object tracking system of claim 1, wherein the processor is further configured for:
determining that a straight line connecting the first antenna and the second antenna of the moving device is parallel to a straight line connecting a third antenna and a fourth antenna of the moving device;
determining that a third CI at a third time of a third TSCI associated with the third antenna matches a fourth CI at a fourth time of a fourth TSCI associated with the fourth antenna, wherein both the third TSCI and the fourth TSCI are associated with another particular antenna of the stationary device;

computing the at least one movement parameter of the moving device based on at least one of:
the plurality of TSCI,
the configuration of antennas of the moving device,
the configuration of antennas of the stationary device,
the time difference between the first time and the second time,
a time difference between the third time and the fourth time,
the distance between the first antenna and the second antenna, and
a distance between the third antenna and the fourth antenna; and computing the STI of the moving device based on at least one of:
the at least one movement parameter,
the first time, the second time, the third time, the fourth time,
the configuration of antennas of the stationary device,
the configuration of antennas of the moving device,
the past STI, and
the past movement parameter.

21. The object tracking system of claim 1, wherein the processor is further configured for:
determining that a straight line connecting the first antenna and the second antenna of the moving device is parallel to a straight line connecting a third antenna and a fourth antenna of the moving device;
determining jointly that the first CI at the first time matches the second CI at the second time, and a third CI at the first time of a third TSCI associated with the third antenna matches a fourth CI at a fourth time of a fourth TSCI associated with the fourth antenna, wherein both the third TSCI and the fourth TSCI are associated with another particular antenna of the stationary device;
computing the at least one movement parameter of the moving device based on at least one of:
the plurality of TSCI,
the configuration of antennas of the moving device,
the configuration of antennas of the stationary device,
the time difference between the first time and the second time,
a time difference between the first time and the fourth time,
the distance between the first antenna and the second antenna, and
a distance between the third antenna and the fourth antenna; and
computing the STI of the moving device based on at least one of:
the at least one movement parameter,
the first time, the second time, the fourth time,
the configuration of antennas of the stationary device,
the configuration of antennas of the moving device,
the past STI, and
the past movement parameter.

22. The object tracking system of claim 1, wherein the transmitter is configured for:
transmitting at least one of: digital data, meta data and wireless network traffic data, with the wireless signal through the wireless multipath channel.

23. A method, implemented by a processor, a memory communicatively coupled with the processor, and a set of instructions stored in the memory to be executed by the processor, comprising:
obtaining a plurality of time series of channel information (TSCI) of a wireless multipath channel, wherein:
the plurality of TSCI are extracted from a wireless signal transmitted from a first wireless device to a second wireless device through the wireless multipath channel,
each of the plurality of TSCI is associated with an antenna of the first wireless device and an antenna of the second wireless device,
one of the first wireless device and the second wireless device is a stationary device,
the other one of the first wireless device and the second wireless device is a moving device moving with an object;
determining that a first channel information (CI) at a first time of a first TSCI associated with a first antenna of the moving device matches a second CI at a second time of a second TSCI associated with a second antenna of the moving device, wherein both the first TSCI and the second TSCI are associated with a same antenna of the stationary device;
computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna;
computing a spatial-temporal information (STI) of the moving device based on at least one of: the at least one movement parameter, the first time, the second time, the configuration of antennas of the moving device, the configuration of at least one antenna of the stationary device, a past STI, and a past movement parameter, wherein at least one of the movement parameter and the STI is related to a current movement of the moving device; and
tracking at least one of the object and the moving device based on the STI, wherein:
the at least one movement parameter comprises at least one of: a distance and an angle;
the STI comprises a location computed based on at least one of: a past location, the distance, and the angle; and
the STI is computed based on an input from a sensor associated with the moving device.

24. The method of claim 23, further comprising:
obtaining the plurality of TSCI from a wireless integrated circuit (IC); and
obtaining at least one of: the past STI and the past movement parameter, from a sensor communicatively coupled with the processor and memory.

25. The method of claim 23, further comprising:
transmitting, to at least one of the first wireless device and a server, at least one of: the at least one movement parameter and the STI.

26. The method of claim 23, further comprising:
switching the wireless multipath channel for obtaining TSCI, when a signal quality metric of the wireless multipath channel is below a first threshold; and
skipping at least one CI of the plurality of TSCI during computing the at least one movement parameter and the STI, when a signal quality metric of the wireless multipath channel is below a second threshold, wherein the CI comprises at least one of: channel state information (CSI), received signal power, compressed CSI, uncompressed CSI, radio state, modem parameters, channel impulse response (CIR), channel frequency response (CFR), an effect of environment on the wireless signal, magnetic response, and phase response.

27. The method of claim 23, further comprising:
determining, during obtaining the plurality of TSCI, that a signal quality associated with the first wireless device is below a threshold, wherein:
  the first wireless device is the stationary device,
  the second wireless device is the moving device, and
  there are multiple first wireless devices including the stationary device in a venue;
determining that a signal quality associated with an additional first wireless device is above an additional threshold; and
configuring the second wireless device to:
  switch from the first wireless device to the additional first wireless device,
  stop receiving the wireless signal from the first wireless device,
  start to receive an additional wireless signal from the additional first wireless device,
  keep a part of the plurality of TSCI already obtained from the wireless signal, and
  obtain a remaining part of the plurality of TSCI by extracting CI from the additional wireless signal instead of the wireless signal.

28. The method of claim 23, further comprising:
determining, during obtaining the plurality of TSCI, that a signal quality associated with the second wireless device is below a threshold, wherein:
  the first wireless device is the moving device,
  the second wireless device is the stationary device, and
  there are multiple second wireless devices including the stationary device in a venue;
determining that a signal quality associated with an additional second wireless device is above an additional threshold;
configuring the second wireless device to stop the following:
  receiving the wireless signal from the first wireless device,
  extracting the plurality of TSCI from the wireless signal,
  determining the matching of CI of first TSCI and CI of second TSCI,
  computing the at least one movement parameter of the moving device, and
  computing the STI of the moving device; and
configuring the additional second wireless device to start the following:
  receiving the wireless signal from the first wireless device,
  extracting a remaining part of the plurality of TSCI from the wireless signal,
  determining the matching of the CI of first TSCI and the CI of second TSCI,
  computing the at least one movement parameter of the moving device, and
  computing the STI of the moving device.

29. An object tracking system, comprising:
a transmitter configured for transmitting a wireless signal through a wireless multipath channel; and
a receiver that comprises a processor, a memory communicatively coupled with the processor, and a set of instructions stored in the memory to be executed by the processor, and is configured for:
  receiving the wireless signal through the wireless multipath channel,
  extracting a plurality of time series of channel information (TSCI) of the wireless multipath channel from the wireless signal, wherein:
    each of the plurality of TSCI is associated with an antenna of the transmitter and an antenna of the receiver,
    one of the transmitter and the receiver is stationary, the other one of the transmitter and the receiver is a moving device moving with an object,
  determining that a first channel information (CI) at a first time of a first TSCI associated with a first antenna of the moving device matches a second CI at a second time of a second TSCI associated with a second antenna of the moving device, wherein both the first TSCI and the second TSCI are associated with a particular antenna of the stationary device,
  computing at least one movement parameter of the moving device based on at least one of: the plurality of TSCI, a configuration of antennas of the moving device, a configuration of at least one antenna of the stationary device, a time difference between the first time and the second time, and a distance between the first antenna and the second antenna,
  computing a spatial-temporal information (STI) of the moving device based on at least one of: the at least one movement parameter, the first time, the second time, the configuration of antennas of the moving device, the configuration of at least one antenna of the stationary device, a past STI, and a past movement parameter, wherein at least one of the movement parameter and the STI is related to a current movement of the moving device, and
  tracking at least one of the object or the moving device, based on the STI, wherein the tracking comprises:
    computing a trajectory of the at least one of the object or the moving device, based on the STI and a history of the STI, and
    displaying the trajectory.

* * * * *